(12) United States Patent
Takatori

(10) Patent No.: US 11,774,801 B2
(45) Date of Patent: Oct. 3, 2023

(54) SURFACE LIGHT SOURCE DEVICE, DISPLAY DEVICE AND LIGHT FLUX CONTROLLING MEMBER

(71) Applicant: Enplas Corporation, Saitama (JP)

(72) Inventor: Hiroshi Takatori, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 17/584,478

(22) Filed: Jan. 26, 2022

(65) Prior Publication Data

US 2022/0244600 A1 Aug. 4, 2022

(30) Foreign Application Priority Data

Jan. 29, 2021 (JP) .................. 2021-013242

(51) Int. Cl.
 *G02F 1/1335* (2006.01)
(52) U.S. Cl.
 CPC .............. *G02F 1/133614* (2021.01)
(58) Field of Classification Search
 CPC .............. G02F 1/133603; G02F 1/133606
 See application file for complete search history.

(56) References Cited

U.S. PATENT DOCUMENTS

| | | | |
|---|---|---|---|
| 2019/0146277 A1 | 5/2019 | Ajichi | |
| 2020/0183224 A1* | 6/2020 | Lee | G02F 1/133514 |
| 2020/0348457 A1* | 11/2020 | Uto | G02F 1/133605 |
| 2020/0355963 A1* | 11/2020 | Liu | H01L 25/0753 |
| 2021/0366414 A1* | 11/2021 | Cheng | G02F 1/133606 |

* cited by examiner

*Primary Examiner* — Eric T Eide

(57) ABSTRACT

A surface light source device includes: a plurality of light-emitting devices, each of the plurality of light-emitting devices including a light-emitting element disposed on a substrate and configured to emit light with a wavelength of 380 to 485 nm and a light flux controlling member disposed over the light-emitting element and configured to control a distribution of light emitted from the light-emitting element; and an optical sheet including a wavelength conversion sheet disposed over the light flux controlling member and configured to convert a wavelength of incident light. The light flux controlling member is formed with a resin composition or a glass composition containing a scattering member, and makes scattering of light with a wavelength longer than the wavelength of 380 to 485 nm large.

16 Claims, 22 Drawing Sheets

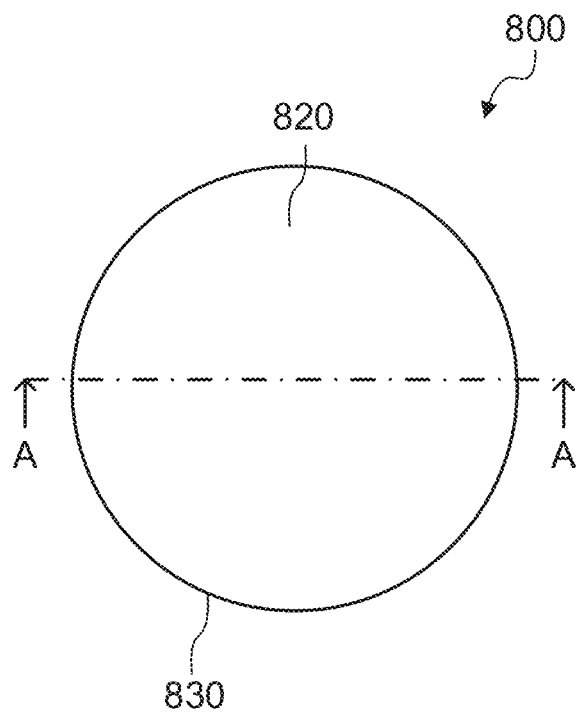
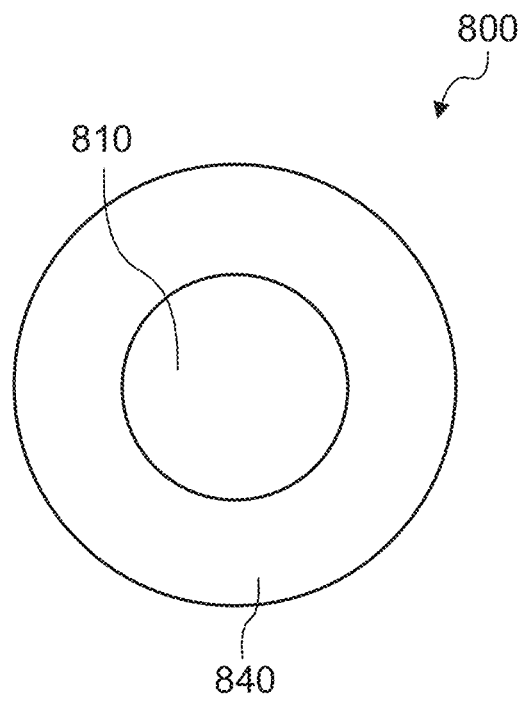
FIG. 22A
FIG. 22B
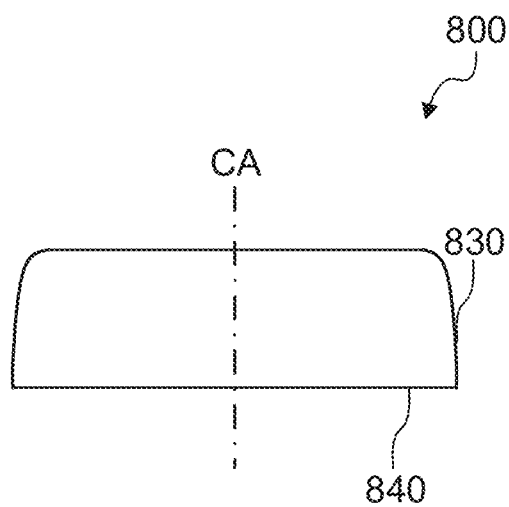
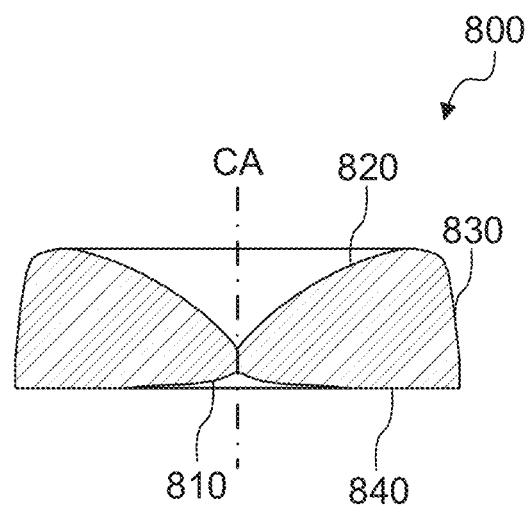
FIG. 22C
FIG. 22D

SURFACE LIGHT SOURCE DEVICE, DISPLAY DEVICE AND LIGHT FLUX CONTROLLING MEMBER

CROSS REFERENCE TO RELATED APPLICATIONS

This application is entitled to the benefit of Japanese Patent Application No. 2021-013242, filed on Jan. 29, 2021, the disclosure of which including the specification, drawings and abstract is incorporated herein by reference in its entirety.

TECHNICAL FIELD

The present invention relates to a surface light source device, a display device and a light flux controlling member.

BACKGROUND ART

In recent years, in transmission image display devices such as liquid crystal display devices, direct surface light source devices including a plurality of light-emitting elements as a light source are used. In addition, in some situation, in direct surface light source devices, a large number of light-emitting elements are disposed for the purpose of light irradiation over a wide range (see, for example, PTL 1).

PTL 1 discloses a backlight device (surface light source device) including a LED substrate, a plurality of blue LEDs disposed on the LED substrate, a plurality of reflection partitions each disposed to surround the plurality of blue LEDs, a diffusion plate disposed above the plurality of reflection partitions, a phosphor sheet disposed above the diffusion plate, and an optical sheet disposed above the phosphor sheet. The lower end of the reflection partition is in contact with the substrate, and the upper end of the reflection partition is in contact with the diffusion plate. Light emitted from blue LED directly reaches the diffusion plate, or reaches the diffusion plate after being reflected at the reflection partition.

In the backlight device disclosed in PTL 1, the plurality of blue LEDs emits light to respective different regions of the diffusion plate, and thus the planar liquid crystal panel can be uniformly illuminated.

CITATION LIST

Patent Literature

PTL 1
US Patent Application Publication No. 2019-0146277

SUMMARY OF INVENTION

Technical Problem

In the backlight device disclosed in PTL 1, however, the distribution of light emitted from the blue LED is not controlled using a lens or the like, and as such there is a room for improvement in luminance unevenness and color unevenness.

An object of the present invention is to provide a surface light source device that can suppress luminance unevenness and chromaticity unevenness. In addition, another object of the present invention is to provide a display device including the surface light source device and a light flux controlling member used for the surface light source device.

Solution to Problem

A surface light source device of an embodiment of the present invention includes: a plurality of light-emitting devices, each of the plurality of light-emitting devices including a light-emitting element disposed on a substrate and configured to emit light with a wavelength of 380 to 485 nm and a light flux controlling member disposed over the light-emitting element and configured to control a distribution of light emitted from the light-emitting element; and an optical sheet including a wavelength conversion sheet disposed over the light flux controlling member and configured to convert a wavelength of incident light. The light flux controlling member is formed with a resin composition or a glass composition containing a scattering member, and makes scattering of light with a wavelength longer than the wavelength of 380 to 485 nm large.

A display device of an embodiment of the present invention includes the surface light source device of the embodiment of the present invention, and a display member configured to be irradiated with light emitted from the surface light source device.

A light flux controlling member of an embodiment of the present invention is used for the surface light source device of the embodiment of the present invention.

Advantageous Effects of Invention

According to the present invention, it is possible to provide a surface light source device that can suppress luminance unevenness and chromaticity unevenness. In addition, according to the present invention, it is possible to provide a display device including the surface light source device and a light flux controlling member used for the surface light source device.

BRIEF DESCRIPTION OF DRAWINGS

FIGS. 22A, 22B, 22C and 22D are diagrams illustrating a configuration of a light flux controlling member according to Embodiment 2.

DESCRIPTION OF EMBODIMENTS

An embodiment of the present invention is elaborated below with reference to the accompanying drawings. In the following description, as a typical example of a surface light source device according to the present invention, a surface light source device suitable for a backlight of a liquid crystal display device is described. The surface light source device can be used as display device 100' in combination with light display member 102 (e.g., a liquid crystal panel) configured to be irradiated with light from the surface light source device (see FIG. 1B).

Embodiment 1

Configurations of Surface Light Source Device and Light-Emitting Device

Figure 1A:
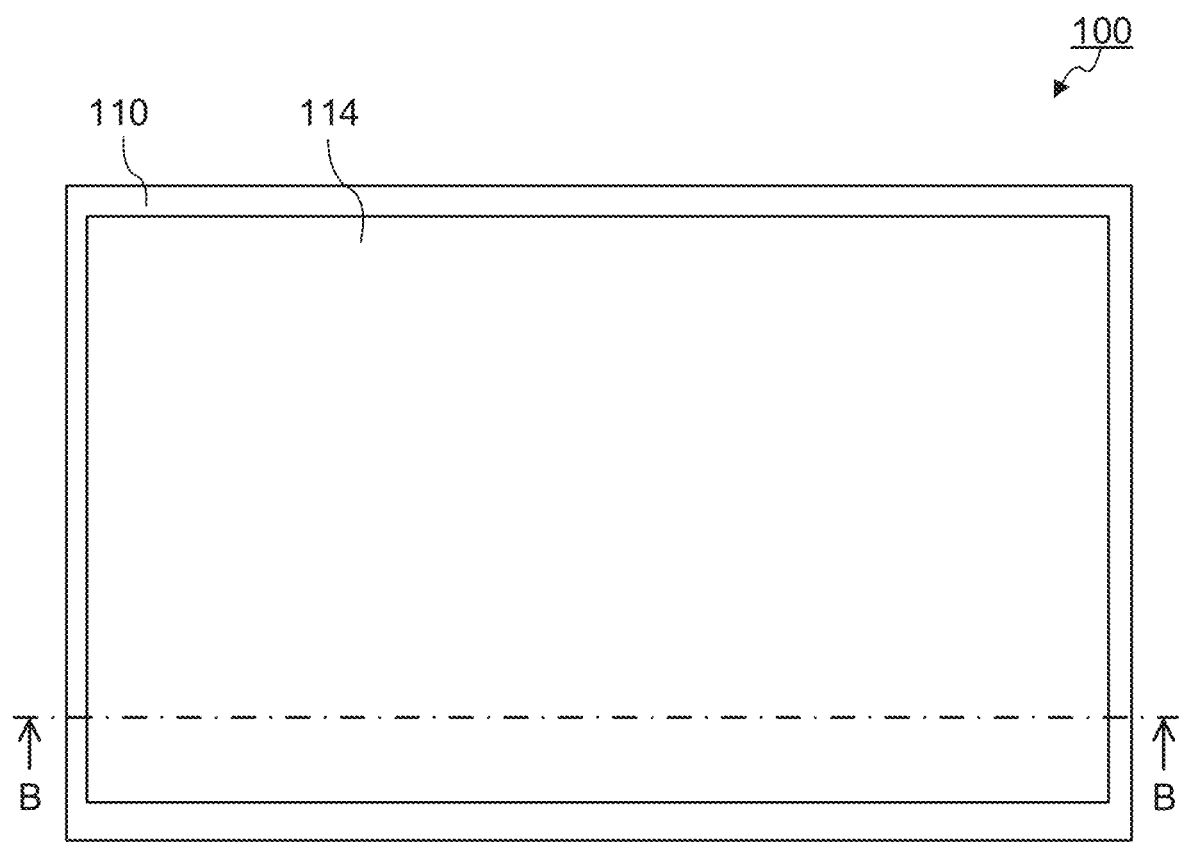
FIGS. 1A and 1B are diagrams illustrating a configuration of a surface light source device according to Embodiment 1.
Figure 1B:
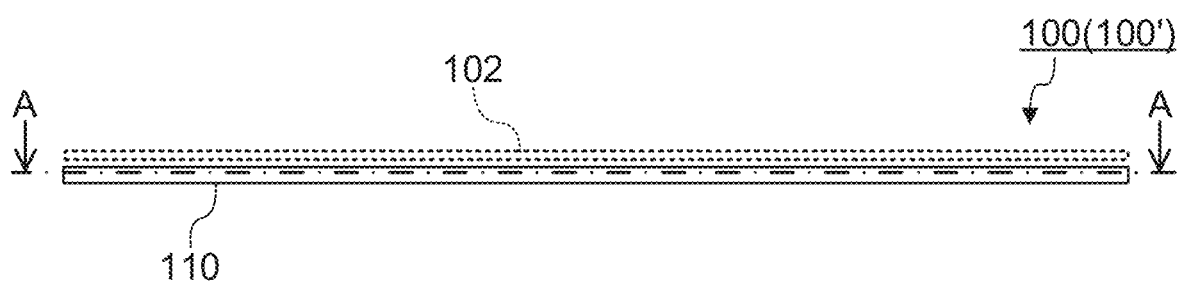
Figure 2A:
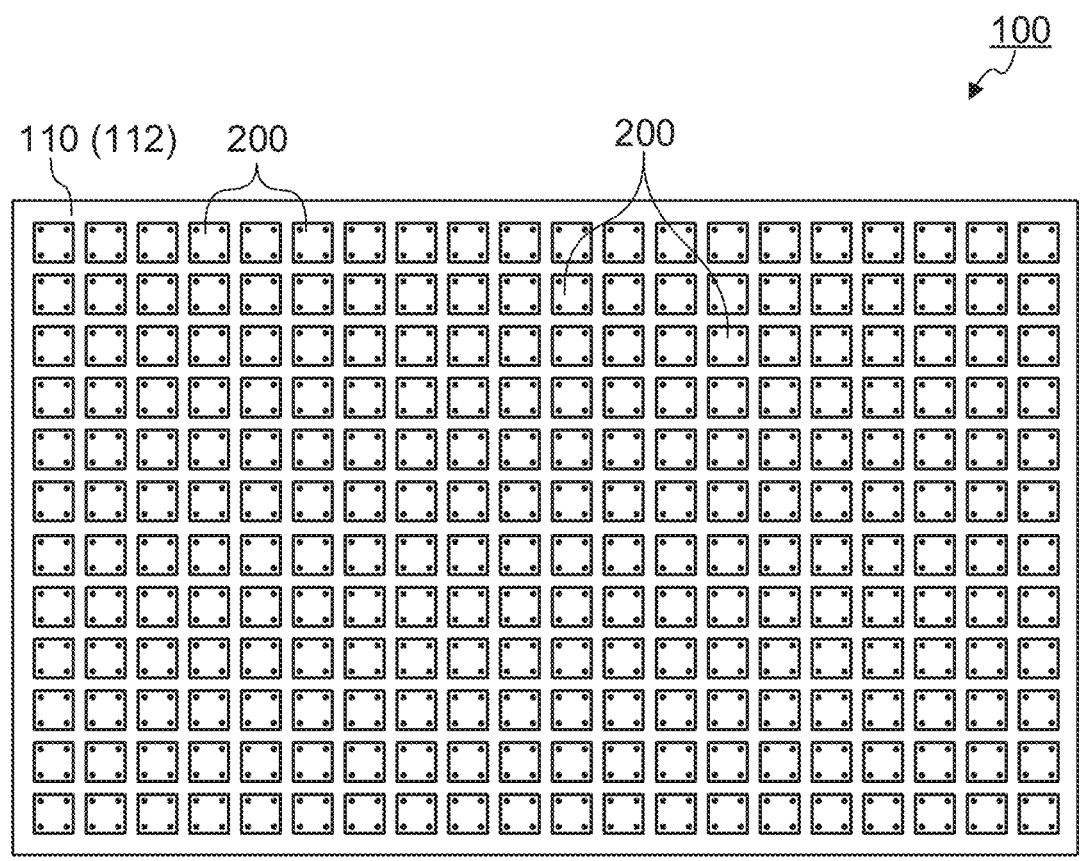
FIGS. 2A and 2B are other diagrams illustrating a configuration of the surface light source device according to Embodiment 1.
Figure 2B:
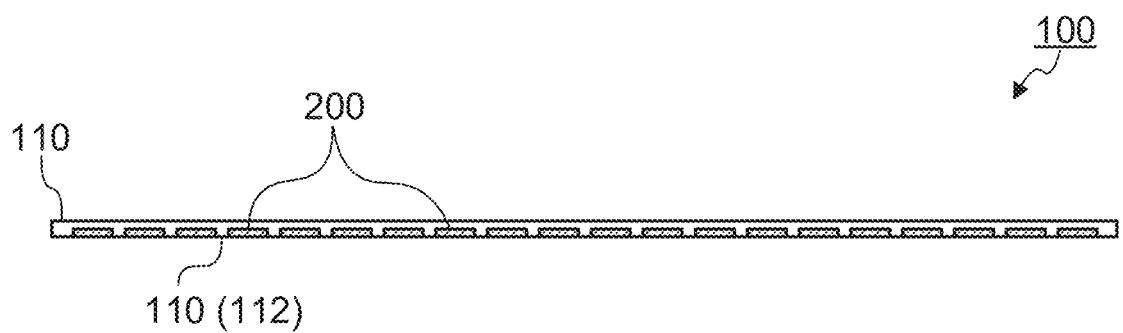
Figure 3:
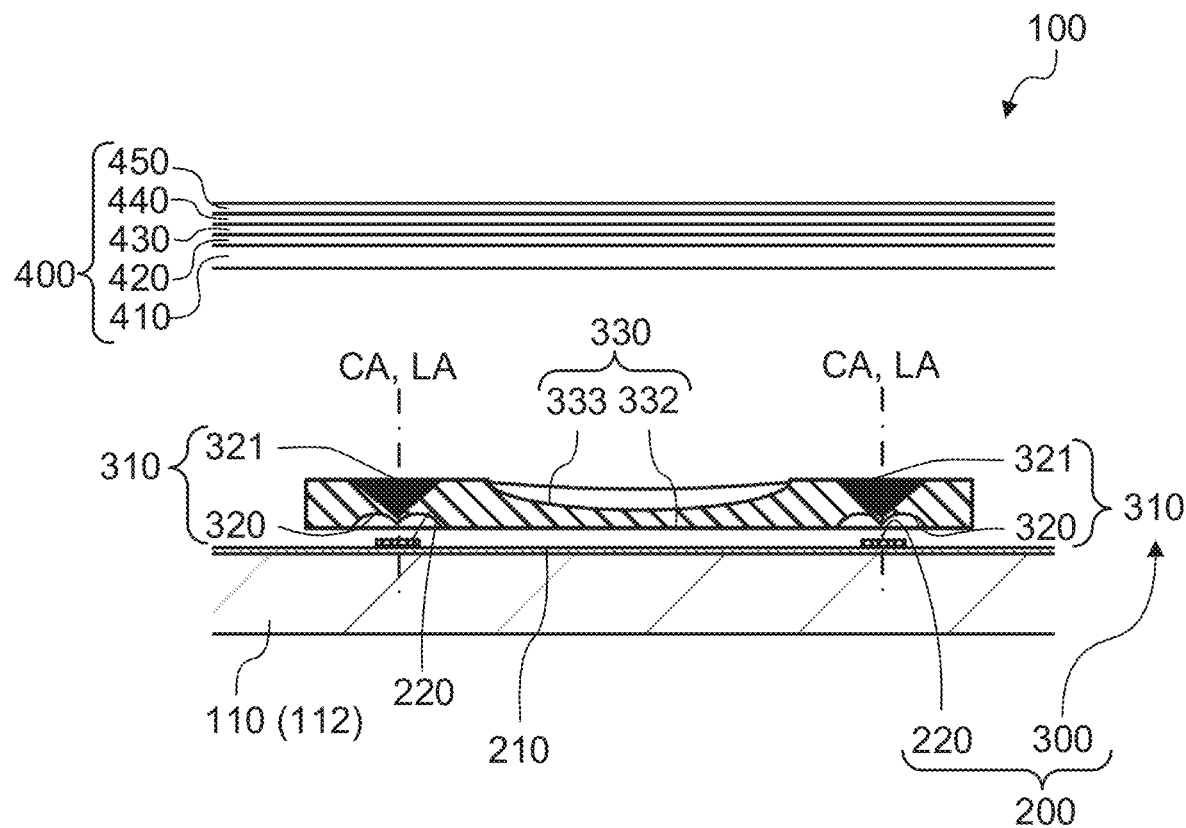
FIG. 3 is a partially enlarged sectional view of FIG. 2B.

FIGS. 1A to 2B are diagrams illustrating a configuration of surface light source device 100 according to Embodiment 1 of the present invention. FIG. 1A is a plan view, and FIG. 1B is a front view. FIG. 2A is a sectional view taken along line A-A of FIG. 1B, and FIG. 2B is a sectional view taken along line B-B of FIG. 1A. FIG. 3 is a partially enlarged sectional view of FIG. 2B.

As illustrated in FIGS. 1A to 3, surface light source device 100 according to the present embodiment includes housing 110, a plurality of light-emitting devices 200 and optical sheet 400. The plurality of light-emitting devices 200 is disposed in a grid (matrix) pattern on bottom plate 112 of housing 110. A reflection sheet may be disposed on the surface of bottom plate 112 or substrate 210 such that the surface of the reflection sheet functions as a diffusive reflection surface, or the surface of bottom plate 112 or substrate 210 may function as a diffusive reflection surface. In the present embodiment, the surface of bottom plate 112 functions as a diffusive reflection surface. In addition, an opening is provided in top plate 114 of housing 110. Optical sheet 400 is disposed to close the opening, and functions as a light-emitting surface. The size of light-emitting surface is not limited, but is, for example, approximately 400 mm×approximately 700 mm.

As illustrated in FIG. 3, light-emitting device 200 is fixed on substrate 210. Substrate 210 is fixed at a predetermined position on bottom plate 112 of housing 110. Light-emitting device 200 includes light-emitting element 220 and light flux controlling member 300.

Light-emitting element 220 is a light source of surface light source device 100, and is mounted on substrate 210. Light-emitting element 220 is, for example, a light-emitting diode (LED) such as a blue light-emitting diode. Light-emitting element 220 emits blue light within a range of wavelength 380 to 485 nm. In addition, the type of light-emitting element 220 is not limited, but light-emitting element 220 that emits light from the top surface and the side surface (e.g., COB type light-emitting diode) is favorably used for light-emitting device 200 according to the present embodiment. The size of one side of light-emitting element 220 is not limited, but it is preferable to be 0.1 to 0.6 mm, more preferably 0.1 to 0.3 mm. In the present invention, the smaller the LED used, the more appropriately light can be distributed, and the optical control member with less chromaticity unevenness can be obtained. For example, the size of light-emitting element 220 is 0.2 mm×0.38 mm. In addition, the distance between substrate 210 and optical sheet 400 is preferably be 5 mm or smaller. In the present invention, the luminance unevenness and the chromaticity unevenness can be suppressed even when the distance between substrate 210 and optical sheet 400 is 5 mm or smaller.

Light flux controlling member 300 is an optical member that controls the distribution of light emitted from light-emitting element 220, and is fixed on substrate 210. As described later, light flux controlling member 300 includes a plurality of incidence units 310, and light flux controlling member 300 is disposed over a plurality of light-emitting elements 220 such that central axis CA of each incidence unit 310 (incidence surface 320) coincides with light axis LA of each light-emitting element 220. Note that, in light flux controlling member 300 according to the present embodiment, incidence unit 310 (incidence surface 320 and first reflection surface 321) of light flux controlling member 300 is rotationally symmetrical. The rotation axis of this incidence unit 310 is referred to as "central axis CA of incidence unit 310, incidence surface 320 or first reflection surface 321". In addition, "light axis LA of light-emitting element 220" means a central light beam of a three-dimensional light flux emitted from light-emitting element 220. A gap for dissipating the heat emitted from light-emitting element 220 to the outside may be or may not be formed between substrate 210 where light-emitting element 220 is mounted and the rear surface of light flux controlling member 300.

Light flux controlling member 300 is formed by integral shaping. The material of light flux controlling member 300 is a resin composition or a glass composition that can transmit light of a desired wavelength. The resin composition includes an optically transparent resin and a scattering member. In addition, the glass composition includes glass and a scattering member. The resin composition or the glass composition transmits blue light with a wavelength of 380 to 485 nm and light with a wavelength longer than that of blue light while scattering the light, while the scattering of the light with a wavelength longer than that of blue light is larger than the scattering of the blue light with a wavelength of 380 to 485 nm. That is, the resin composition or the glass composition scatters light with a wavelength longer than that of blue light, than blue light with a wavelength of 380 to 485 nm. Thus, light flux controlling member 300 formed with the resin composition or the glass composition scatters light arriving from the outside with a wavelength longer than that of blue light while controlling the distribution of blue light emitted from light-emitting element 220. Here, the light with a wavelength longer than that of blue light is preferably red light with a wavelength of 625 to 780 nm.

Examples of the optically transparent resin include polymethylmethacrylate (PMMA), polycarbonate (PC), and epoxy resin (EP). The type of the scattering member is not limited as long as the scattering member largely scatters light with a wavelength longer than that of blue light with a wavelength of 380 to 485 nm. The examples of the scattering member include silicone particles, silica particles, melamine-formaldehyde condensation, and titanium oxide particles. Preferably, the scattering member is silicone particles in view of heat stability and uniform scattering with respect to the optically transparent resins. The number-average particle diameter of the scattering member is not limited, but is preferably 4 to 10 μm. In the case where the number-average particle diameter of the scattering member is smaller than 4 μm, light with a wavelength longer than that of blue light with a wavelength of 380 to 485 nm may not be scattered while blue light with a wavelength of 380 to 485 nm is scattered. On the other hand, in the case where the number-average particle diameter of the scattering member is greater than 10 μm, the light distribution function of light flux controlling member 300 may be reduced. The density of the scattering member in the resin composition or in the glass composition is not limited as long as the above-mentioned function can be ensured, but is preferably 0.01 to 0.3 wt. %, more preferably 0.1 to 0.15 wt. %, with respect to the resin composition or the glass composition.

Examples of commercially available scattering members include silicone particles (e.g., XC99-A8808 with a number-average particle diameter of 0.7 μm, Tospearl 9000 with a number-average particle diameter of 2 μm, Tospearl 130 with a number-average particle diameter of 3 μm, Tospearl 9500 with a number-average particle diameter of 4.5 μm, Tospearl 1100 with a number-average particle diameter of 10 μm; Momentive Performance Materials), melamine-formaldehyde condensation particles (e.g., epostar S6 with a number-average particle diameter of 0.4 μm, Nippon Shokubai Co., Ltd.), and silica particles (e.g., seahostar KE-P30 with a number-average particle diameter of 0.3 μm, seahostar KE-S30 with a number-average particle diameter of 0.3 μm; Nippon Shokubai Co., Ltd.).

The method of determining whether the resin composition scatters light with a wavelength longer than that of blue light with a wavelength of 380 to 485 nm is not limited. Here, whether it is easy to scatter blue light, or it is easy to scatter red light is described. For example, scattering of blue light and scattering of red light are compared by using a light guide plate with a constant thickness composed of a resin composition containing a scattering member. More specifically, it suffices to apply white light on a side surface of the light guide plate, and analyze the color component of light emitted from the top surface or the bottom surface of the light guide plate. For example, in the case where the blue light is emitted in a region close to the incident position of the white light and the red light is emitted in a region remote from the incident position of the white light, it can be determined that the resin composition (scattering member) scatters the blue light more than the red light. Conversely, in the case where the red light is emitted in a region close to the incident position of the white light and the blue light is emitted in a region remote from the incident position of the white light, it can be determined that the resin composition (scattering member) scatters the red light more than the blue light. The resin composition (scattering member) with the desired scattering characteristics can be readily found by repeating the evaluation experiment while changing the type of the scattering member.

The configuration of light flux controlling member 300 according to the present embodiment is separately elaborated later.

Optical sheet 400 includes a wavelength conversion sheet that converts the wavelength of incident light. The configuration of optical sheet 400 is not limited as long as an appropriate amount of the above-mentioned wavelength conversion sheet is provided. Optical sheet 400 may be composed of a single sheet member, or a plurality of sheet members. In the present embodiment, optical sheet 400 is composed of a plurality of sheet members. More specifically, in the present embodiment, optical sheet 400 includes light diffusion plate 410, quantum dot sheet 420, first prism sheet 430, second prism sheet 440, and dual brightness enhancement film (DBEF (registered trademark)) 450 in this order from light-emitting device 200 side. In addition, other examples of the sheet member of optical sheet 400 include a composite member of a light diffusion plate and a prism sheet.

Light diffusion plate 410 is a plate-shaped member with light diffusibility, and transmits light emitted from light-emitting device 200 while diffusing the light. Normally, light diffusion plate 410 has substantially the same size as a display member such as a liquid crystal panel. For example, light diffusion plate 410 is formed of an optically transparent resin such as polymethylmethacrylate (PMMA), polycarbonate (PC), polystyrene (PS), and styrene methyl methacrylate copolymerization resin (MS). In order to provide light diffusibility, minute irregularity is formed in the surface of light diffusion plate 410, or a light diffuser such as beads is scattered inside light diffusion plate 410. Normally, light diffusion plate 410 has substantially the same size as liquid crystal panel such as display member.

Quantum dot sheet 420 is a sheet member containing first quantum dot and second quantum dot, and transmits blue light emitted from light-emitting device 200 while converting it into white light. Examples of the wavelength conversion sheet include quantum dot sheet 420 and a phosphor sheet. The quantum dot sheet includes a first quantum dot that converts at least a part of light with a wavelength of 380 to 485 nm into red light with a wavelength of 605 to 780 nm, and a second quantum dot that converts at least a part of light with a wavelength of 380 to 485 nm into green light with a wavelength of 500 to 585 nm. Examples of the first quantum dot and the second quantum dot include CdS, CdSe, CdTe and InP.

In the present embodiment, white light is emitted using the first quantum dot and the second quantum dot. More specifically, with the first quantum dot, at least a part of blue light with a wavelength of 380 to 485 nm is converted into red light with a wavelength within 625 to 780 nm. In addition, with the second quantum dot, at least a part of blue light with a wavelength of 380 to 485 nm is converted into green light with a wavelength within 500 to 585 nm. Then, the converted red light, the converted green light, and the blue light transmitted through optical sheet 400 are combined, and thus white light is emitted.

First prism sheet 430 includes a plurality of first ridges, and transmits the incident light while controlling the travelling direction of the incident light. First ridgelines of the plurality of first ridges are straight lines disposed in parallel to each other. The first ridge may be disposed on the light-emitting device 200 side, or on the dual brightness enhancement film 450 side.

Second prism sheet 440 includes a plurality of second ridges, and transmits the incident light while controlling the travelling direction of the incident light. Second ridgelines of the plurality of second ridges are straight lines disposed in parallel to each other. The second ridge may be disposed on light-emitting device 200 side, or on the dual brightness enhancement film 450 side.

It is preferable that the first ridgeline of the first ridge and the second ridgeline of the second ridge intersect each other in plan view.

Dual brightness enhancement film 450 is a reflective polarization film based on a multi-layer thin film technique.

In surface light source device 100 according to the present embodiment, blue light emitted from each light-emitting element 220 is spread by light flux controlling member 300 to illuminate a wide range of light diffusion plate 410. The blue light emitted from each light flux controlling member 300 is further diffused while being converted into white light by optical sheet 400. As a result, surface light source device 100 according to the present embodiment uniformly illuminates planar display member (e.g., liquid crystal panel).

In the present embodiment, the plurality of light-emitting elements 220 and the plurality of light-emitting devices 200 are disposed separately from each other in a grid pattern. The distance between light-emitting devices 200 adjacent to each other may be smaller than half the center-to-center distance of the plurality of light-emitting elements 220. Here, "the center-to-center distance of the plurality of light-emitting elements 220" means the center-to-center distance of two light-emitting elements 220 that belong to different light-emitting devices 200. In this manner, light is more widely guided by light flux controlling member 300, and thus the darkening between light-emitting devices 200 can be suppressed.

In addition, it is important that there is a gap between light-emitting devices 200 adjacent to each other, and that light-emitting devices 200 are not in contact with each other. If they are provided with no gap therebetween, light emitted from the end portion of light flux controlling member 300 may impinge on the end portion of adjacent light flux controlling member 300 or may be reflected by the end portion, thus affecting the light emission quality over optical sheet 400.

Configuration of Light Flux Controlling Member

Figure 4A:
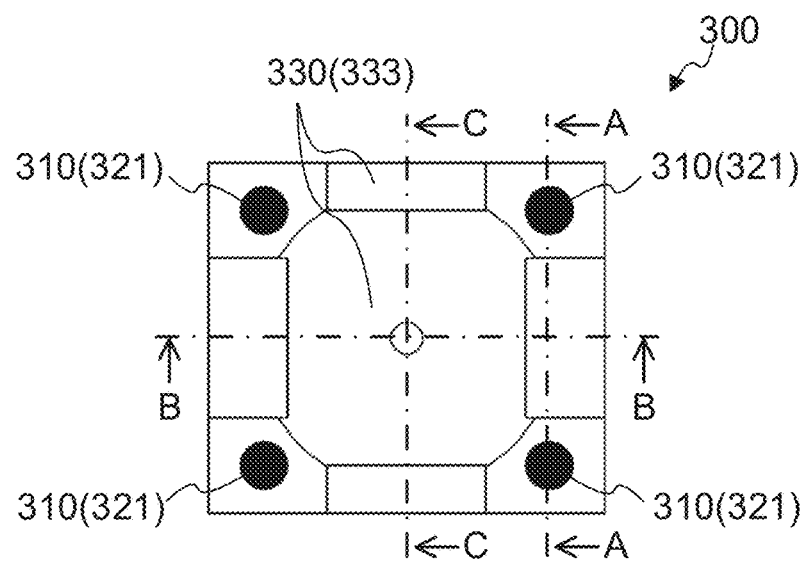
FIGS. 4A, 4B and 4C are diagrams illustrating a configuration of a light flux controlling member according to Embodiment 1.
Figure 4B:
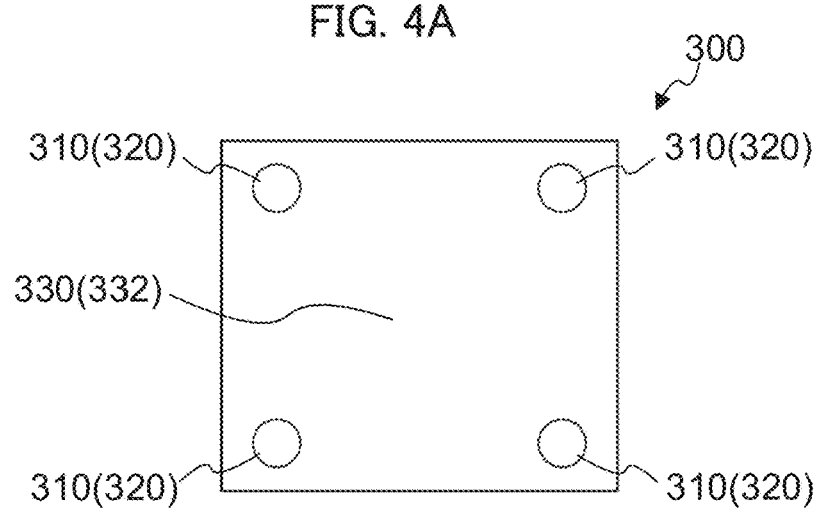
Figure 4C:
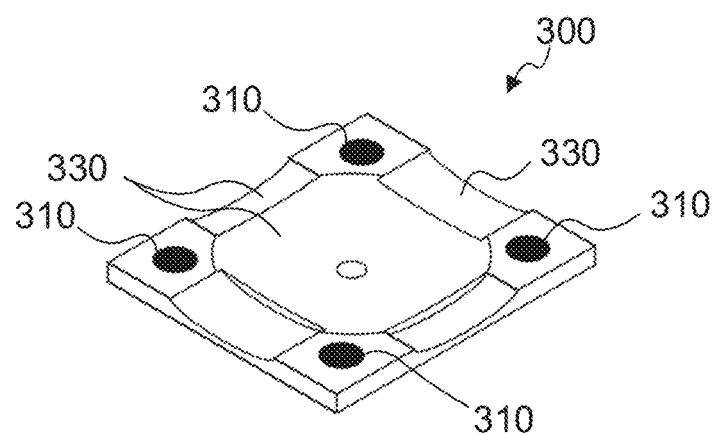
Figure 5A:
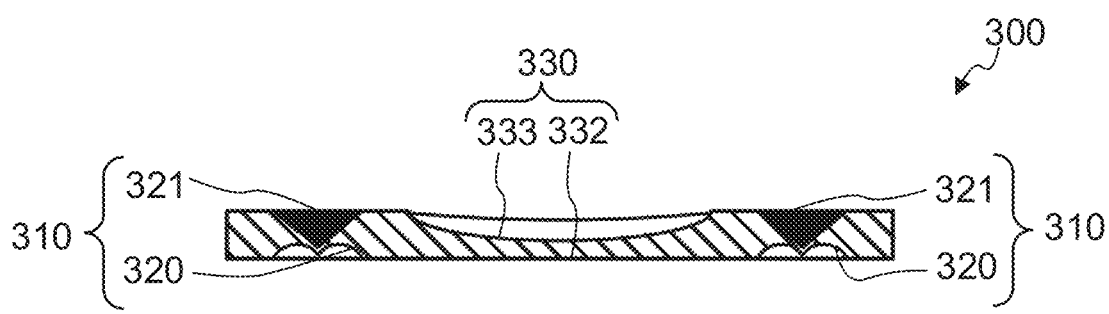
FIGS. 5A, 5B, 5C and 5D are diagrams illustrating a configuration of the light flux controlling member of Embodiment 1.
Figure 5B:
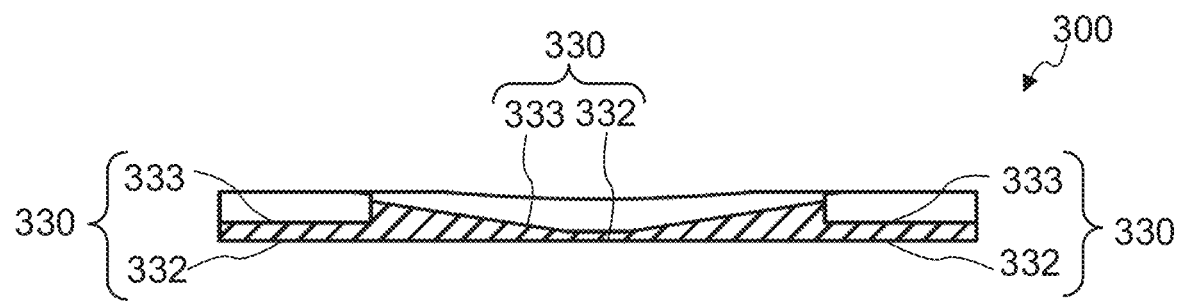
Figure 5C:
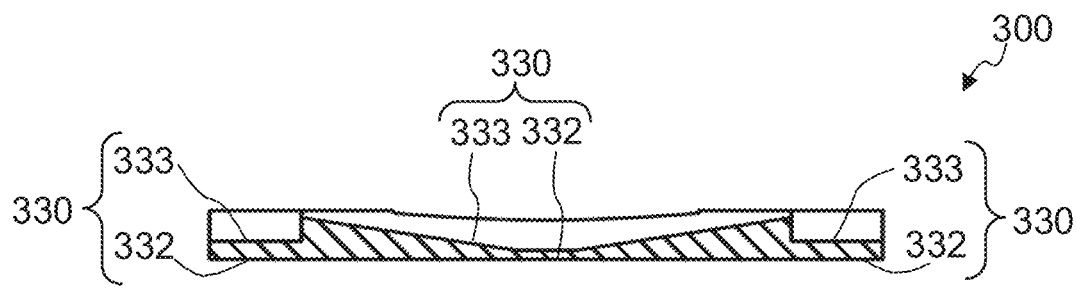
Figure 5D:
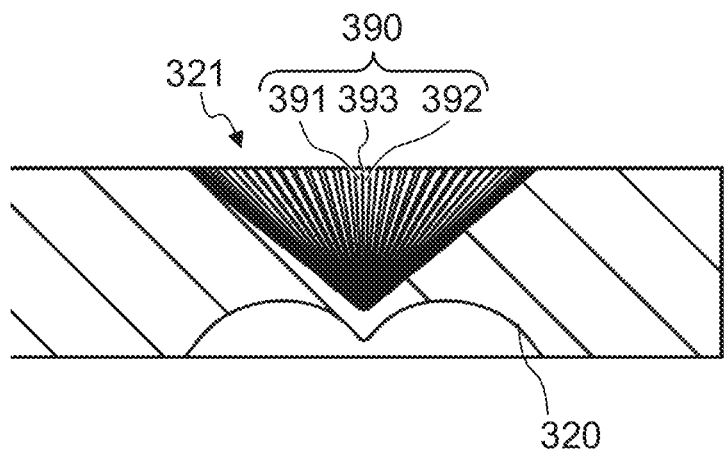

FIG. 4A is a plan view of light flux controlling member 300 according to Embodiment 1, FIG. 4B is a bottom view, and FIG. 4C is a perspective view. FIG. 5A is a sectional view taken along line A-A of FIG. 4A, FIG. 5B is a sectional view taken along line B-B of FIG. 4A, FIG. 5C is a sectional view taken along line C-C of FIG. 4A, and FIG. 5D is a partially enlarged view of FIG. 5A.

Light flux controlling member 300 according to the present embodiment is an optical member for controlling the distribution of light emitted from the plurality of light-emitting elements 220 disposed on substrate 210, and includes the plurality of incidence units 310 and emission unit 330. The plurality of incidence units 310 is disposed in a grid pattern corresponding to the arrangement of light-emitting element 220. Emission unit 330 is disposed between the plurality of incidence units 310 in the direction along substrate 210.

Each of the plurality of incidence units 310 allows incidence of the light emitted from light-emitting element 220. Incidence unit 310 includes incidence surface 320 that allows incidence of light emitted from light-emitting element 220, and first reflection surface 321 that reflects, toward emission unit 330, light entered from incidence surface 320.

Incidence surface 320 is an inner surface of a recess disposed on the rear side of light flux controlling member 300 and formed at a position facing light-emitting element 220. Incidence surface 320 enters most of the light emitted from light-emitting element 220 into light flux controlling member 300 while controlling the travelling direction of the light. Incidence surface 320 intersects light axis LA of light-emitting element 220, and is rotationally symmetrical (circularly symmetrical) about light axis LA. The shape of incidence surface 320 is not limited, and is set such that light entered from incidence surface 320 travels toward first reflection surface 321 and first emission surface 333. In the present embodiment, incidence surface 320 has a shape whose distance from substrate 210 gradually increases as the distance from light axis LA of light-emitting element 220, and then the distance from substrate 210 gradually decreases as the distance from light axis LA of light-emitting element 220 increases.

First reflection surface 321 is disposed on the front side of light flux controlling member 300 at a position opposite light-emitting element 220 with incidence surface 320 therebetween, and first reflection surface 321 laterally reflects light entered from incidence surface 320 in a direction away from light axis LA of light-emitting element 220. Here, the lateral direction does not mean the direction of the outer edge of light flux controlling member, but means travelling 360 degrees outward in the radial direction around the optical axis.

In this manner, first reflection surface 321 suppresses upward transmission of light entered from incidence surface 320 and prevents generation of a bright spot at a portion immediately above light-emitting element 220, and, prevents generation of a dark point at a portion between light-emitting elements 220 by guiding the light to the portion between light-emitting elements 220. The shape of first reflection surface 321 is not limited as long as the light entered from incidence surface 320 can be laterally reflected. For example, first reflection surface 321 may be configured to be rotationally symmetrical (circularly symmetrical) about light axis LA of light-emitting element 220, and to extend (away from substrate 210) toward the front side as the distance from light axis LA of light-emitting element 220 increases.

In the rotationally symmetrical shape, the generatrix from the center portion to the outer periphery portion is a curve or a straight line inclined with respect to the optical axis of light-emitting element 220. First reflection surface 321 is a recessed surface obtained by rotating the generatrix 360 degrees around central axis CA of incidence surface 320 as a rotation axis. In the present embodiment, the generatrix is a straight line.

As illustrated in FIG. 5D, first reflection surface 321 may include a plurality of ridges 390 disposed to connect its center portion and outer edge. Each ridge 390 includes first inclined surface 391, second inclined surface 392 paired with first inclined surface 391, and ridgeline 393 as a boundary line between first inclined surface 391 and second inclined surface 392. The plurality of ridges 390 is disposed such that a valley part is formed between each ridge 390.

With first reflection surface 321 provided with ridge 390, light entered from incidence surface 320 is further reflected and the upward transmission of the light can be further suppressed.

In the present invention, incidence surface 320 and first reflection surface 321 are inner surfaces of recesses, and in plan view, the area of the opening edge of the recess making up first reflection surface 321 is preferably 0.5 times to 2.0 times, more preferably 0.5 times to 1.5 times, still more preferably 0.5 times to 1.3 times the area of the opening edge of the recess making up incidence surface 320. In this manner, the size of first reflection surface 321 with respect to incidence surface 320 is smaller than that of known total reflection lenses. A reason for this is that the present invention is designed such that light incident on incidence surface 320 after emission from the center of light-emitting element 220 reaches not only first reflection surface 321, but also first emission surface 333.

Emission unit 330 emits light entered from the plurality of incidence units 310 while guiding the light. In the present embodiment, when it is assumed that four incidence units 310 are disposed at respective corners of a virtual quadrangle, light flux controlling member 300 includes four emission units 330 disposed at positions corresponding to the four sides of the virtual quadrangle along the four sides, and one emission unit 330 surrounded by the virtual quadrangle. As illustrated in FIGS. 5A to 5C, each emission unit 330 includes second emission surface 332 disposed on the rear side of light flux controlling member 300 and configured to reflect light from first reflection surface 321 of incidence unit 310. In addition, emission unit 330 includes first emission surface 333 disposed opposite to second emission surface 332 on the front side of light flux controlling member 300. First emission surface 333 reflects a part of light from incidence unit 310, and emits another part of the light.

In addition, emission unit 330 includes an emission facilitation part for facilitating the emission of light that travels between second emission surface 332 and first emission surface 333. The emission facilitation part is disposed at least at one of second emission surface 332 and first emission surface 333.

In the present embodiment, as illustrated in FIGS. 5A to 5C, the emission facilitation part is formed at first emission surface 333, and the distance between first emission surface 333 and second emission surface 332 decreases in the direction away from incidence unit 310. With this configuration, the greater the distance from incidence unit 310, the more easily the light guided from incidence unit 310 is emitted from first emission surface 333.

The shape of first emission surface 333 is not limited. In the present embodiment, four first emission surfaces 333 disposed at positions corresponding to the four sides of the virtual quadrangle are recessed surfaces that have a curvature in the direction along the virtual quadrangle side, and do not have a curvature in the direction perpendicular to the side (see FIGS. 5A to 5C). On the other hand, first emission surface 333 surrounded by the virtual quadrangle is a recessed surface composed of a part of the side surface and the upper bottom of a truncated cone disposed upside down (see FIGS. 5B and 5C).

Note that the configuration of the emission facilitation part is not limited to above-mentioned example as long as the above-mentioned function can be ensured. For example, the emission facilitation part may be at least one selected from among a recessed surface, a rough surface, a Fresnel surface, a groove and a through hole disposed at least at one of second emission surface 332 and first emission surface 333.

In the case where the emission facilitation part is a recessed surface formed in second emission surface 332 or first emission surface 333, the distance between second emission surface 332 and first emission surface 333 decreases as the distance from incidence unit 310 increases, and thus the light that travels between second emission surface 332 and first emission surface 333 is easily emitted from first emission surface 333. In the case where the emission facilitation part is a rough surface formed in second emission surface 332, irregular reflection, not specular reflection, of the light that travels between second emission surface 332 and first emission surface 333 is caused at the rough surface, and thus the light is easily emitted from first emission surface 333. In the case where the emission facilitation part is a rough surface formed in first emission surface 333, diffusive transmission, not specular reflection, of the light that travels between second emission surface 332 and first emission surface 333 is caused at the rough surface, and thus the light is easily emitted from first emission surface 333. In the case where the emission facilitation part is a Fresnel surface or a groove formed in second emission surface 332, the light that travels between second emission surface 332 and first emission surface 333 is reflected at the surface making up the Fresnel surface or the groove toward first emission surface 333 such that the incident angle at first emission surface 333 is small, and thus the light is easily emitted from first emission surface 333. In the case where the emission facilitation part is a Fresnel surface or a groove formed in first emission surface 333, the light that travels between second emission surface 332 and first emission surface 333 is emitted at the Fresnel surface or the surface making up the Fresnel surface, and thus the light is easily emitted from first emission surface 333. In the case where the emission facilitation part is a through hole that opens to second emission surface 332 and first emission surface 333, the light that travels between second emission surface 332 and first emission surface 333 is emitted at the surface making up the through hole, and thus the light is easily emitted from first emission surface 333.

Luminance Distribution

Figure 6:
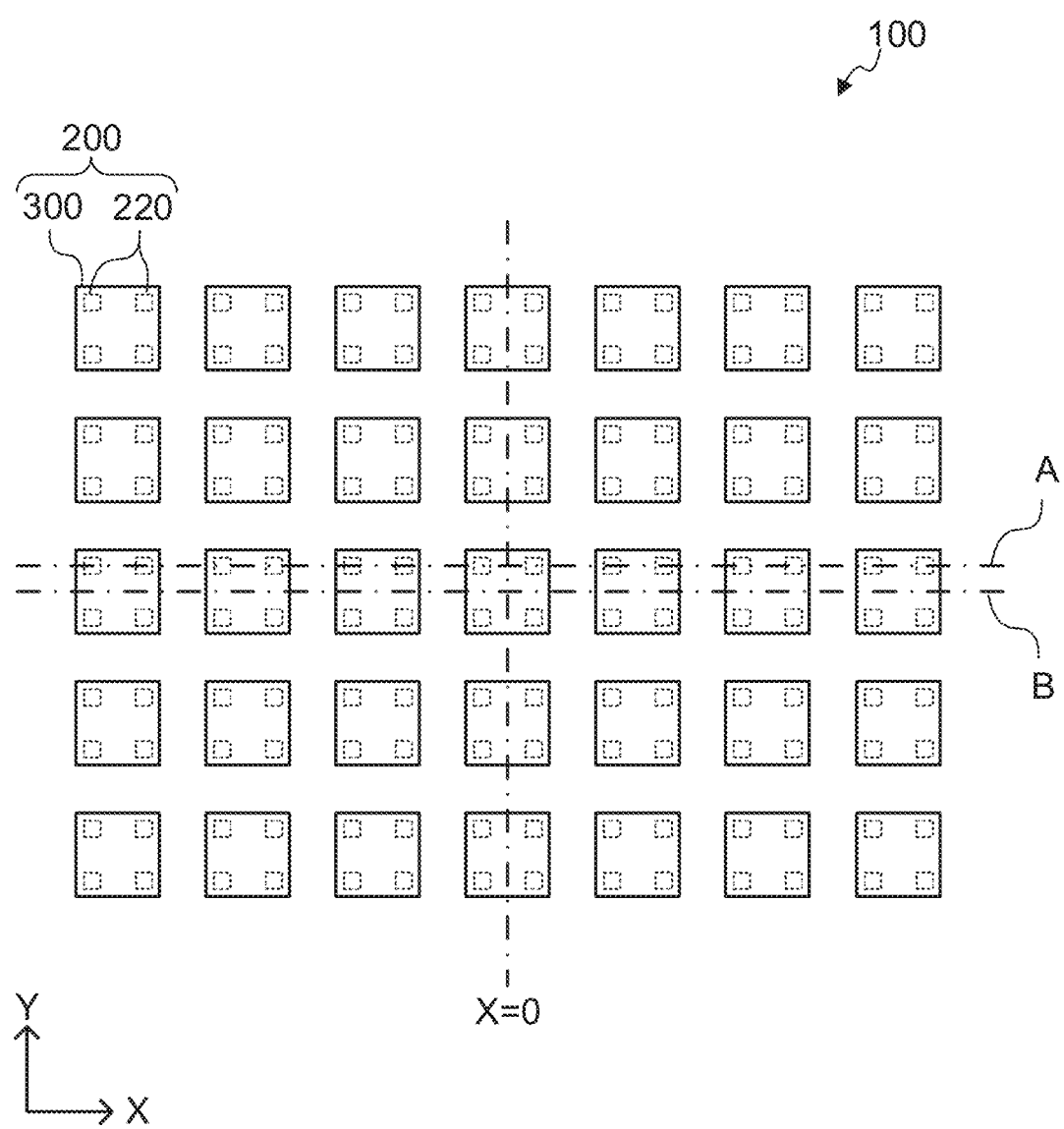
FIG. 6 is a diagram for explaining a measurement condition for the luminance distribution.

Here, the luminance distribution in surface light source device 100 was examined. FIG. 6 is a diagram for explaining a measurement condition for the luminance distribution. The size of the light-emitting surface of light-emitting element 220 is 0.2 mm×0.38 mm. The distance between light-emitting elements 220 in the X direction in FIG. 6 is 12 mm, and the distance between light-emitting elements 220 in the Y direction in FIG. 6 is 12 mm. In addition, the distance between substrate 210 and optical sheet 400 is 2 mm. The above-mentioned light flux controlling member 300 was used as a light flux controlling member. Poly methyl methacrylic acid methyl (PMMA) was used as resin. As scattering members, silicone particles of three types (with a number-average particle diameter of 7 μm, a number-average particle diameter of 4.5 μm, and a number-average particle diameter of 0.7 μm), melamine-formaldehyde condensation particles (with a number-average particle diameter of 0.4 μm), and silica particles (with a number-average particle diameter of 0.3 μm) were used.

In addition, for each scattering member (or resin composition containing a scattering member), whether it is easy to scatter blue light with a wavelength of 380 to 485 nm, or red light with a wavelength of 625 to 780 nm was determined by the above-described method. As a result, it was confirmed that the silicone particle (T7-XC) with a number-average particle diameter of 7 μm and the silicone particle (TSR9500) with a number-average particle diameter of 4.5 μm less scatter the blue light with a wavelength of 380 to 485 nm and easily scatter the red light with a wavelength of 625 to 780 nm. Conversely, it was confirmed that the silicone particle (XC99-A8808) with a number-average particle diameter of 0.7 µm, melamine-formaldehyde condensation particle (S6) with a number-average particle diameter of 0.4 µm, and silica particle (KE-P) with a number-average particle diameter of 0.3 µm easily scatter blue light with a wavelength of 380 to 485 nm, and less scatter the red light with a wavelength of 625 to 780 nm.

The density of the silicone particle with a number-average particle diameter of 7 µm with respect to the resin composition is 0.15 wt %, the density of the silicone particle with a number-average particle diameter of 4.5 µm with respect to the resin composition is 0.10 wt %, the density of the silicone particle with a number-average particle diameter of 0.7 µm with respect to the resin composition is 0.05 wt %, the density of the silica particle with a number-average particle diameter of 0.3 µm with respect to the resin composition is 0.10 wt %, and the density of the melamine-formaldehyde condensation particle with a number-average particle diameter of 0.4 µm with respect to the resin composition is 0.01 wt %.

In addition, as optical sheet 400, light diffusion plate 410, quantum dot sheet 420, first prism sheet 430 (BEFIII; 3M Japan Inc.), second prism sheet 440 (BEFIII; 3M Japan Inc.) and dual brightness enhancement film (DBEF) 450 were used.

Figure 7A:
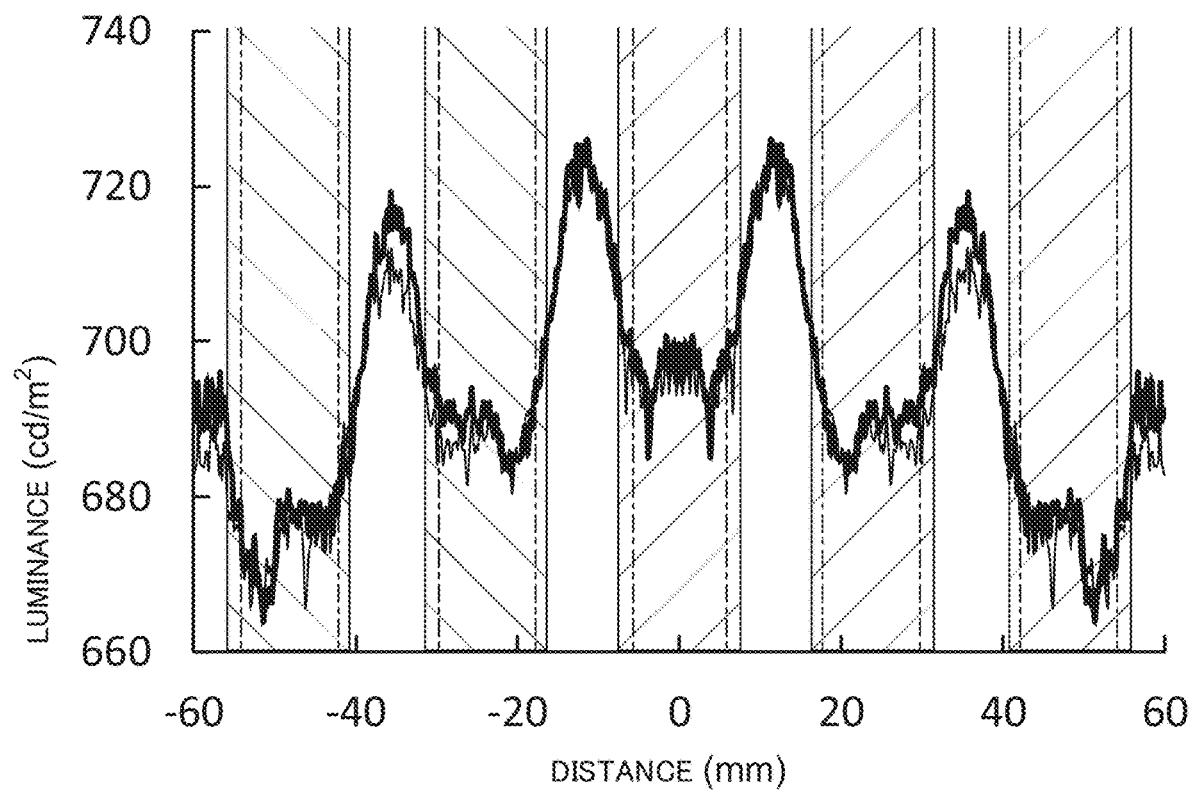
FIGS. 7A and 7B illustrate a luminance distribution on line A of FIG. 6.
Figure 7B:
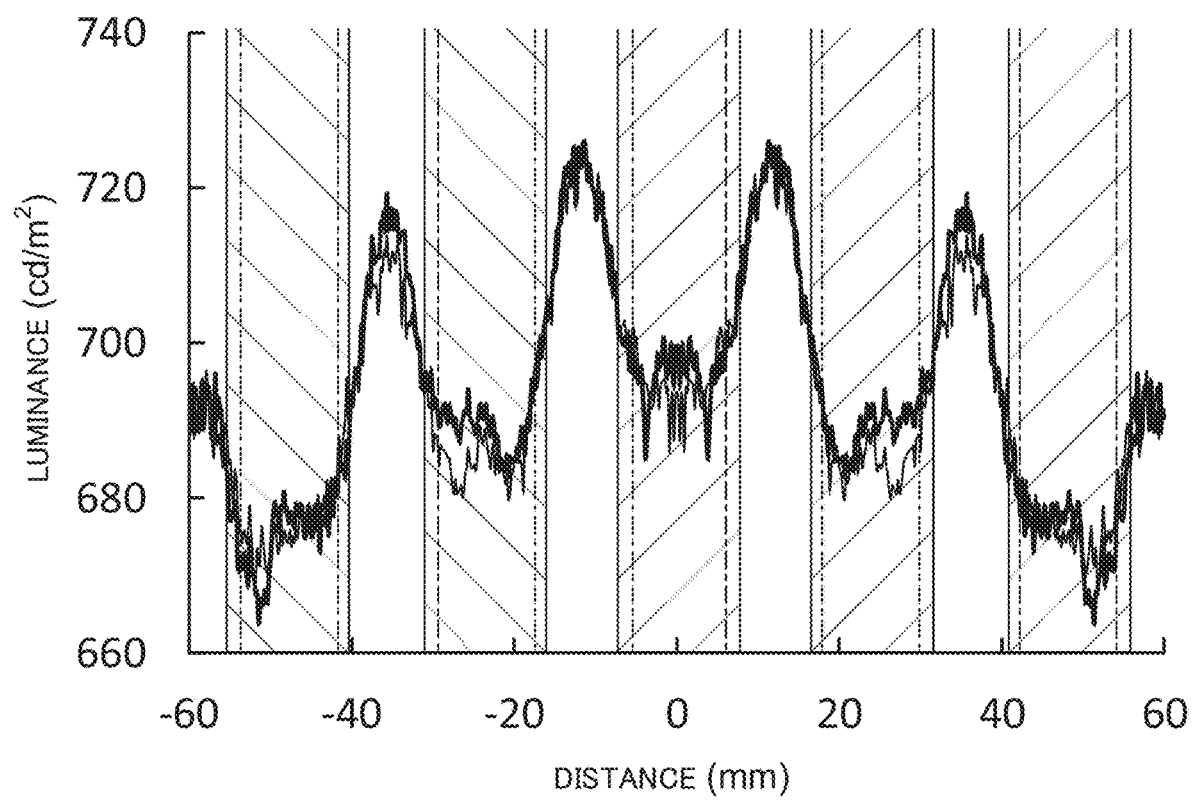
Figure 8A:
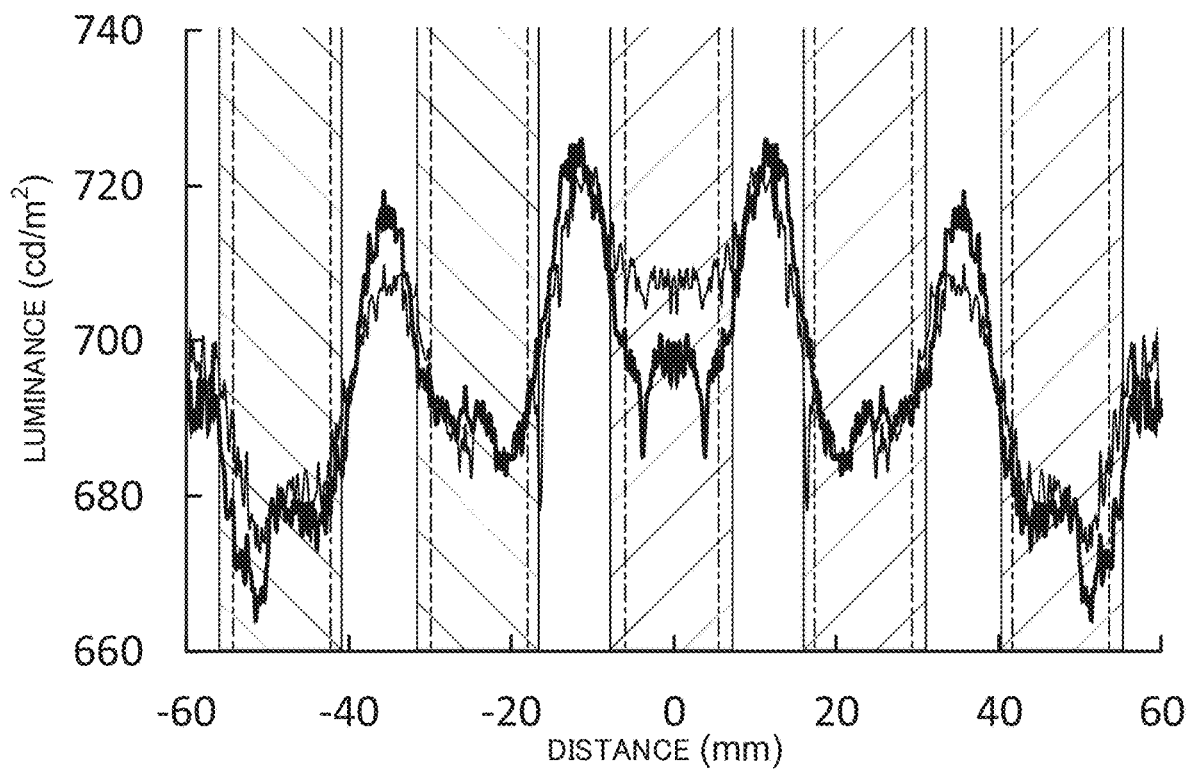
FIGS. 8A and 8B illustrate another luminance distribution on line A of FIG. 6.
Figure 8B:
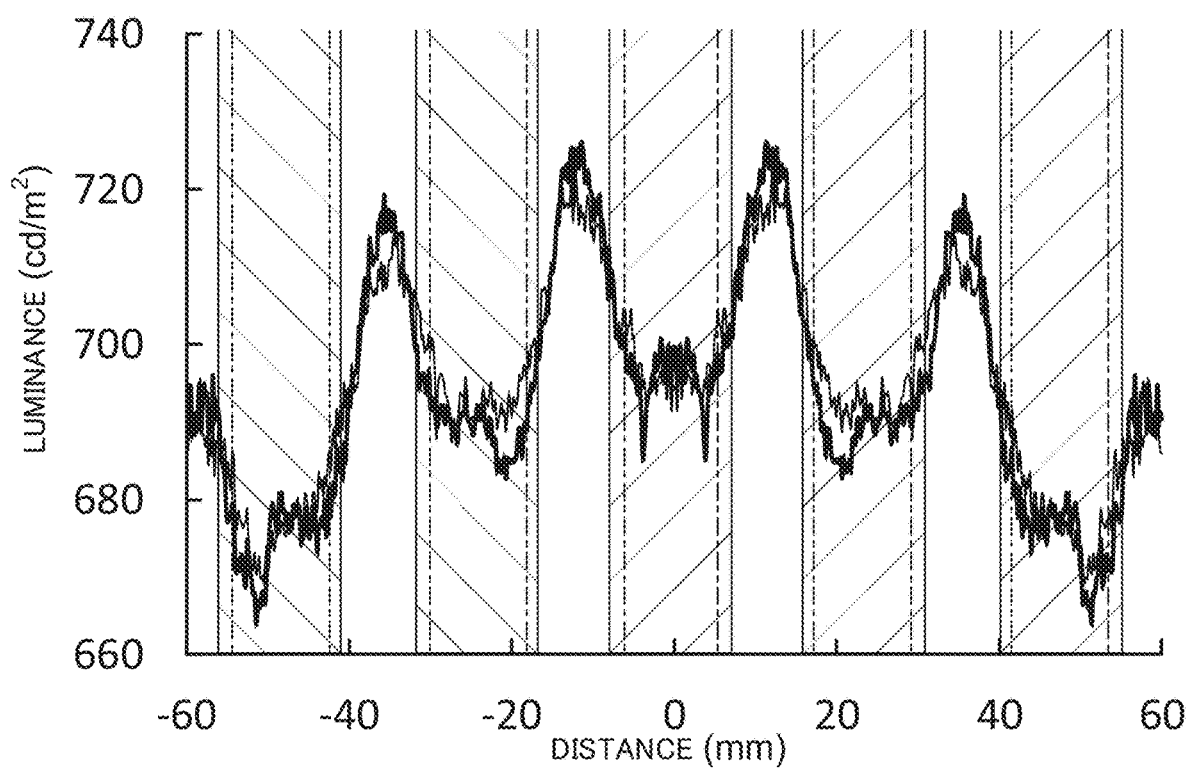
Figure 9:
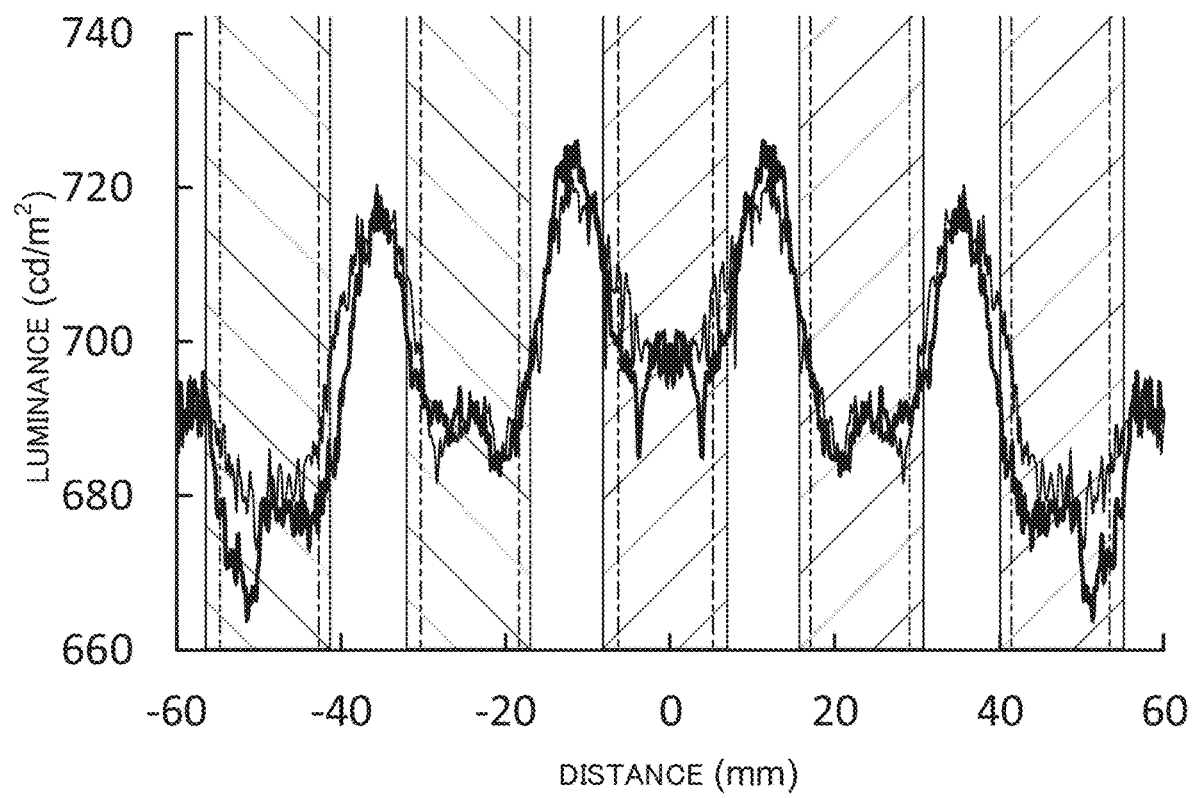
FIG. 9 illustrates another luminance distribution on line A of FIG. 6.

FIGS. 7A to 9 illustrate luminance distributions at line A of FIG. 6. FIG. 7A is a luminance distribution of a case where a light flux controlling member produced using a resin composition containing silicone particles with a number-average particle diameter of 7.0 µm is used as a scattering member, and FIG. 7B is a luminance distribution of a case where a light flux controlling member produced using a resin composition containing the silicone particle with a number-average particle diameter of 4.5 µm is used as a scattering member. FIG. 8A is a luminance distribution of a case where a light flux controlling member produced using a resin composition containing the silicone particle with a number-average particle diameter of 0.7 µm is used as a scattering member, and FIG. 8B is a luminance distribution of a case where a light flux controlling member produced using a resin composition containing the silica particle with a number-average particle diameter of 0.3 µm is used as a scattering member. FIG. 9 is a luminance distribution of a case where a light flux controlling member produced using a resin composition containing the melamine-formaldehyde condensation particle with a number-average particle diameter of 0.4 µm is used as a scattering member.

Figure 10A:
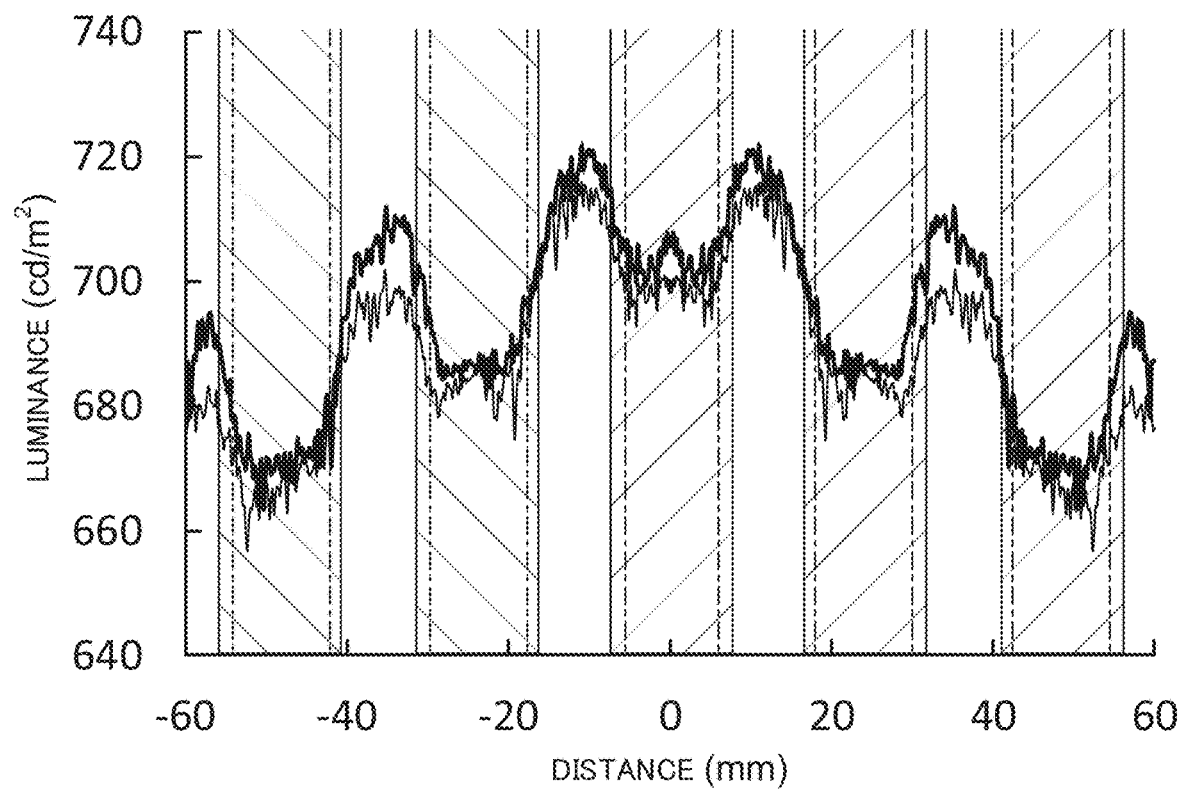
FIGS. 10A and 10B illustrate a luminance distribution on line B of FIG. 6.
Figure 10B:
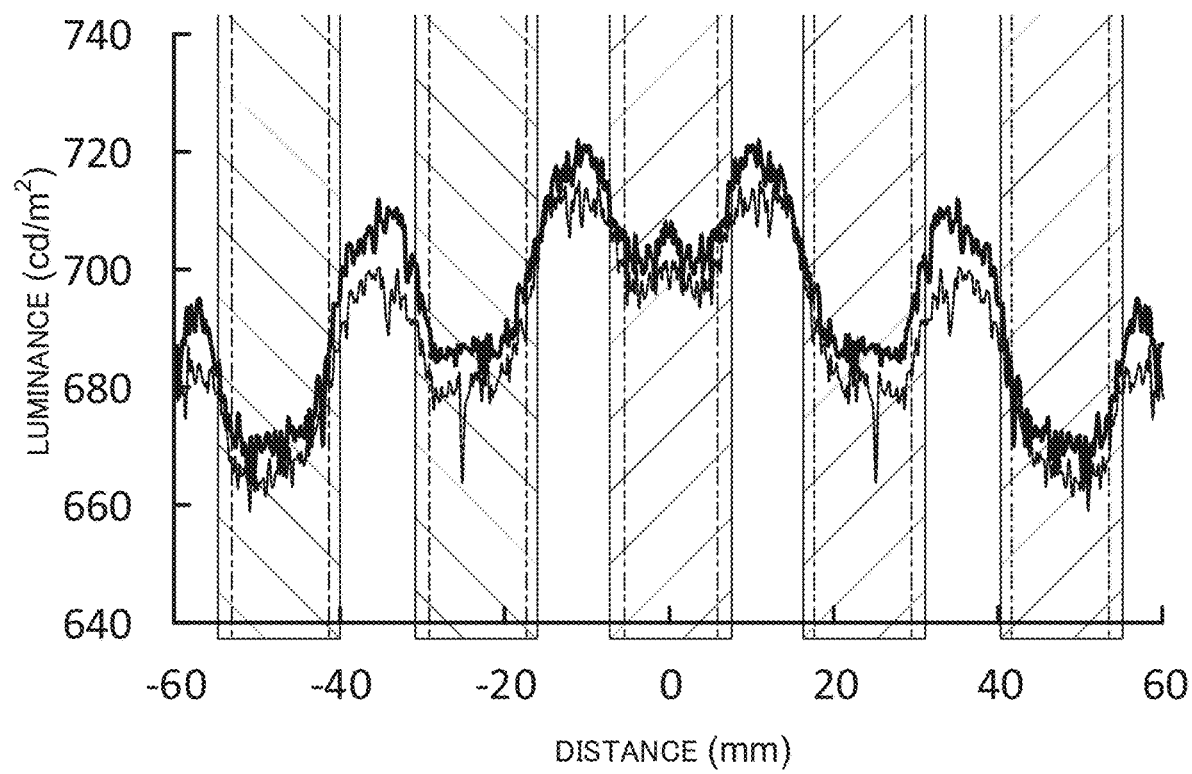
Figure 11A:
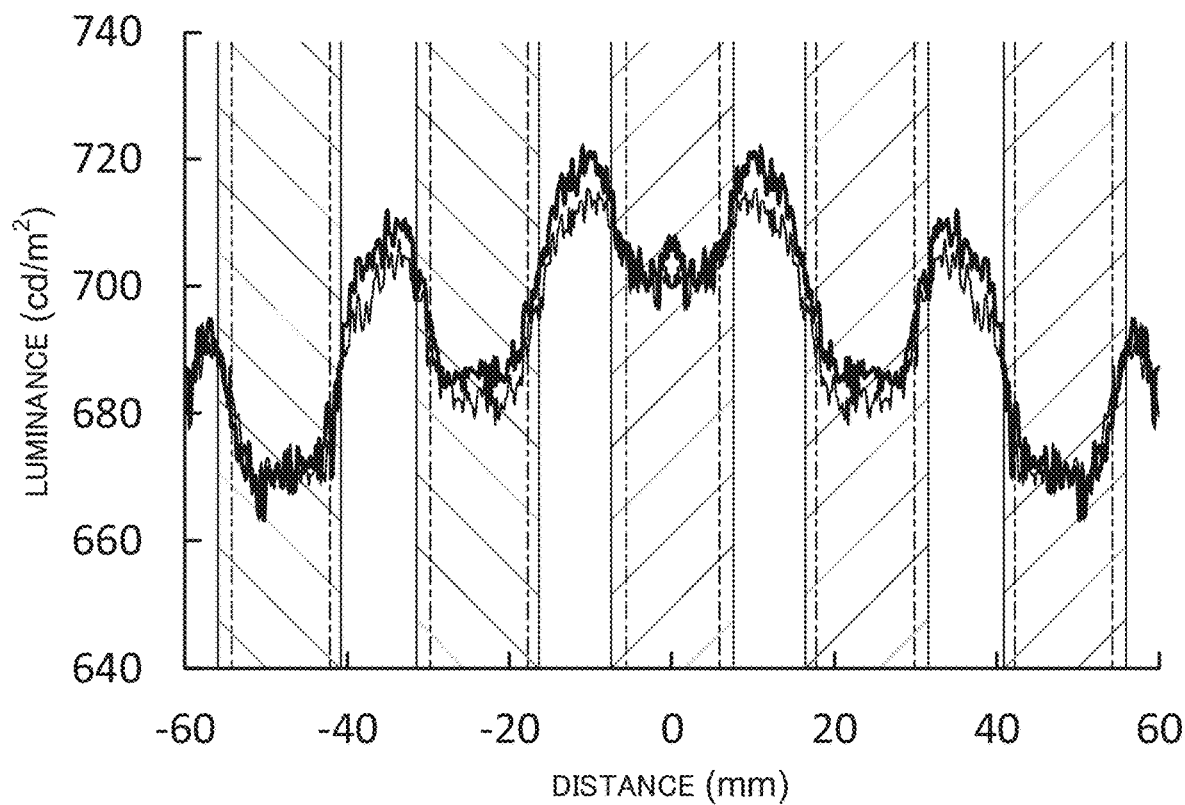
FIGS. 11A and 11B illustrate another luminance distribution on line B of FIG. 6.
Figure 11B:
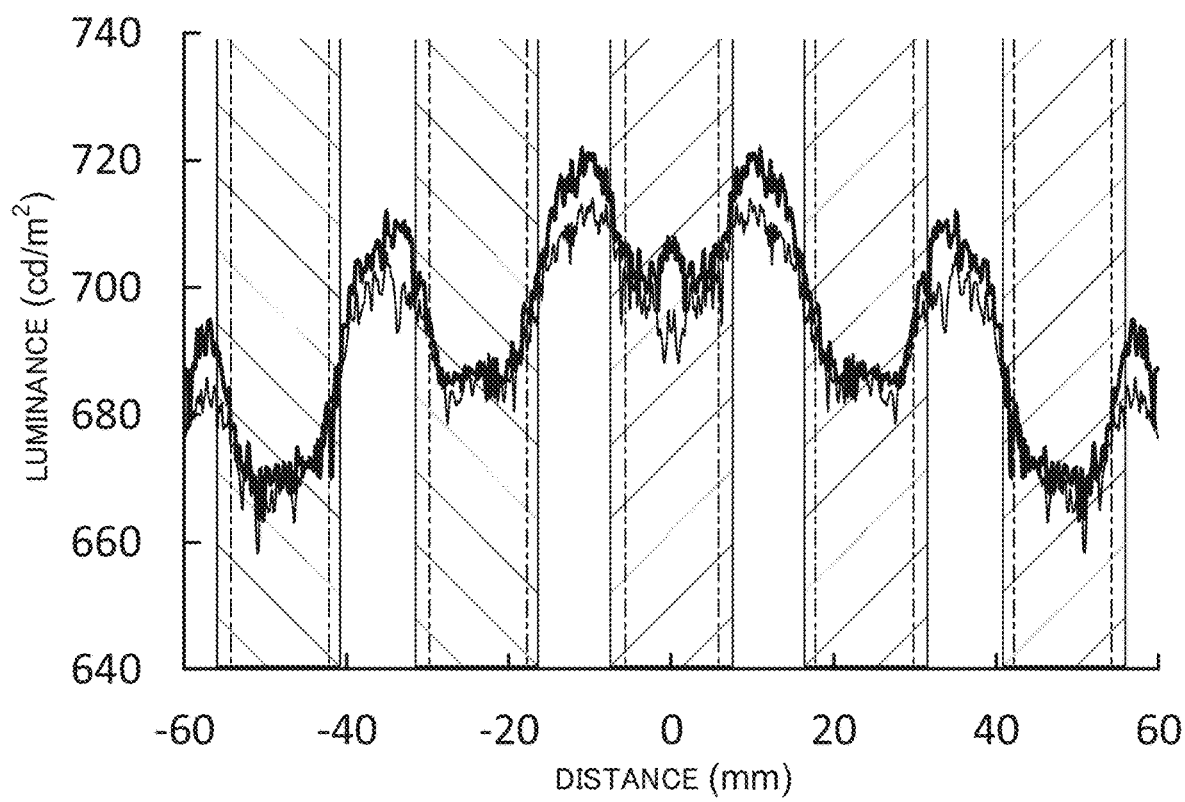
Figure 12:
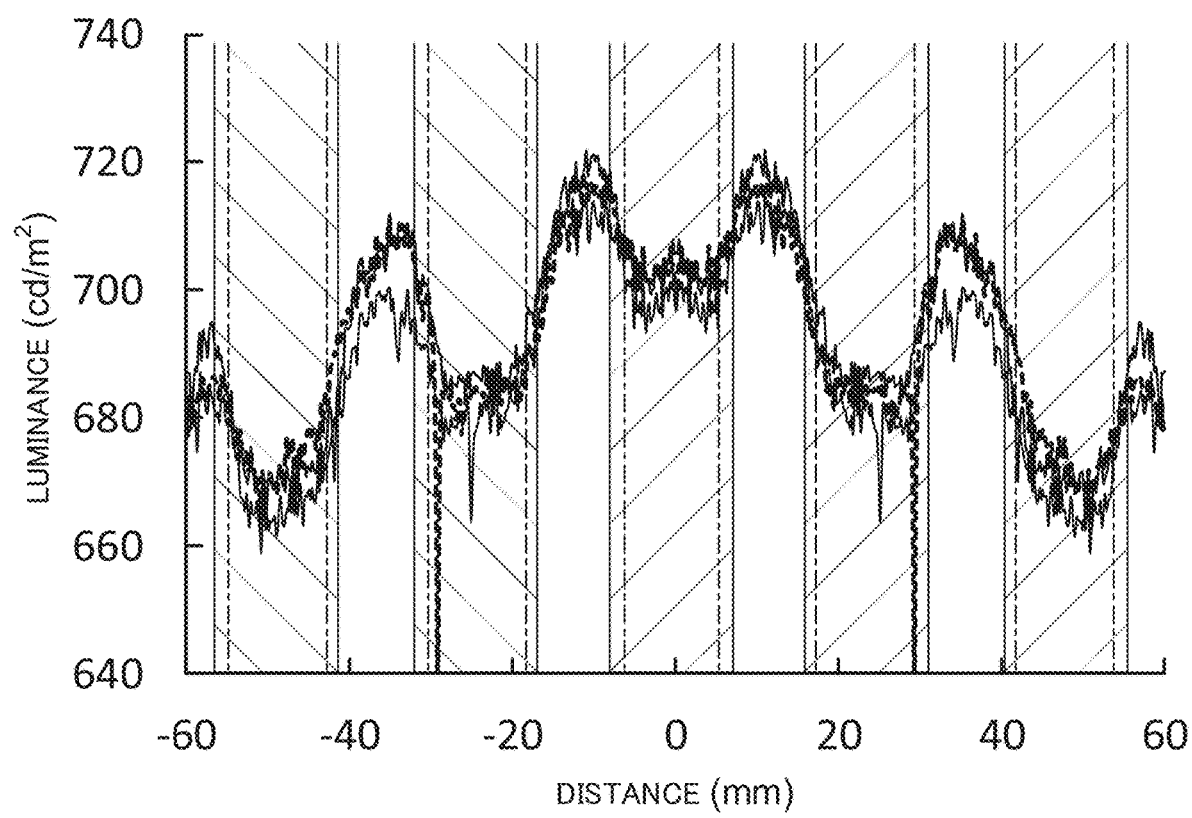
FIG. 12 illustrates another luminance distribution on line B of FIG. 6.

FIGS. 10A to 12 illustrate luminance distributions at line B of FIG. 6. FIG. 10A is a luminance distribution of a case where a light flux controlling member produced using a resin composition containing silicone particles with a number-average particle diameter of 7.0 µm is used as a scattering member, and FIG. 10B is a luminance distribution of a case where a light flux controlling member produced using a resin composition containing the silicone particle with a number-average particle diameter of 4.5 µm is used as a scattering member. FIG. 11A is a luminance distribution of a case where a light flux controlling member produced using a resin composition containing the silicone particle with a number-average particle diameter of 0.7 µm is used as a scattering member, and FIG. 11B is a luminance distribution of a case where a light flux controlling member produced using a resin composition containing the silica particle with a number-average particle diameter of 0.3 µm is used as a scattering member. FIG. 12 is a luminance distribution of a case where a light flux controlling member produced using a resin composition containing the melamine-formaldehyde condensation particle with a number-average particle diameter of 0.4 µm is used as a scattering member.

In FIGS. 7A to 12, the abscissa indicates the distance from the position of X=0 illustrated in FIG. 6, and the ordinate indicates the luminance. In FIGS. 7A to 12, the thick solid line indicates a result of a case where a light flux controlling member with no scattering member is used, and the thin solid line indicates a result of a case where light flux controlling members provided with respective scattering members are used. The hatched region in FIGS. 7A to 12 corresponds to light flux controlling member 300, and the dashed line indicates light axis LA of light-emitting element 220.

As illustrated in FIGS. 7A to 12, it was confirmed that the luminance unevenness decreases when a predetermined light flux controlling member 300 according to the present embodiment is used in comparison with a light flux controlling member with no scattering member. This can be seen from the fact that the peaks of each graph become lower and the valleys become shallower.

Chromaticity Distribution

Here, the chromaticity distribution of surface light source device 100 was examined. The condition for the light-emitting device of the chromaticity measurement is the same as the condition of the measurement of the luminance distribution.

Figure 13A:
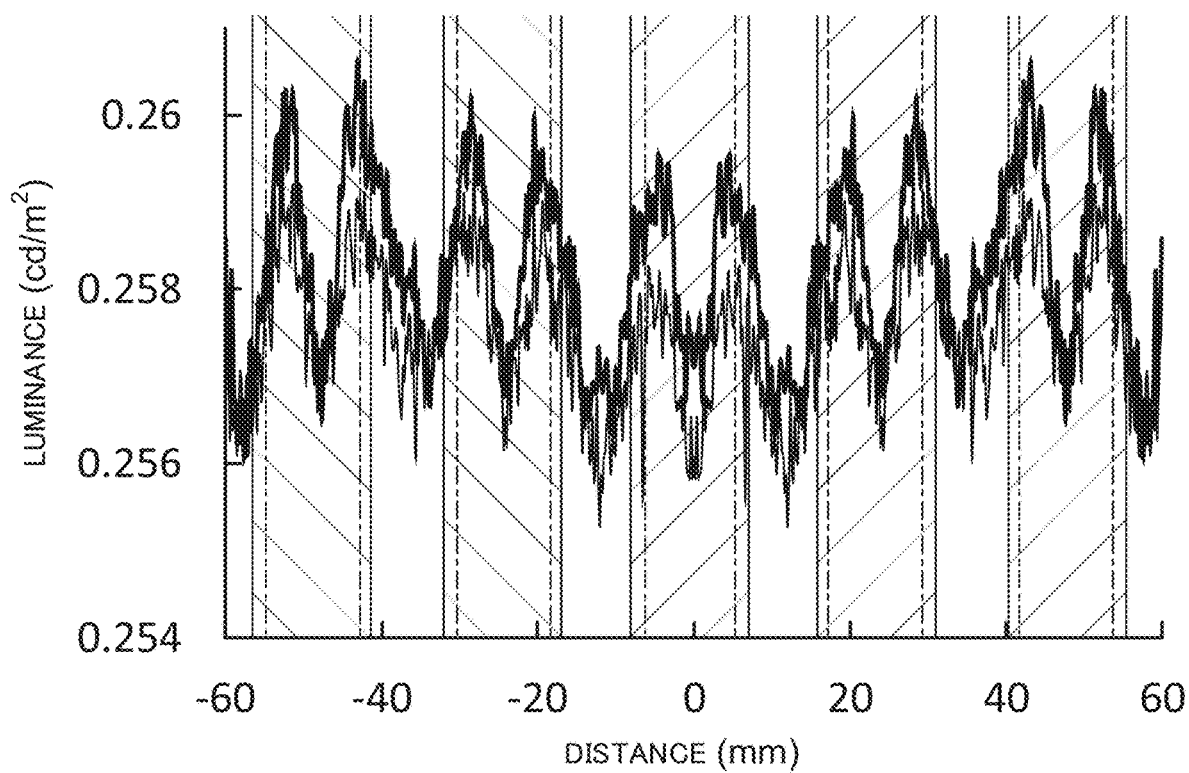
FIGS. 13A and 13B illustrate a chromaticity distribution on line A of FIG. 6.
Figure 13B:
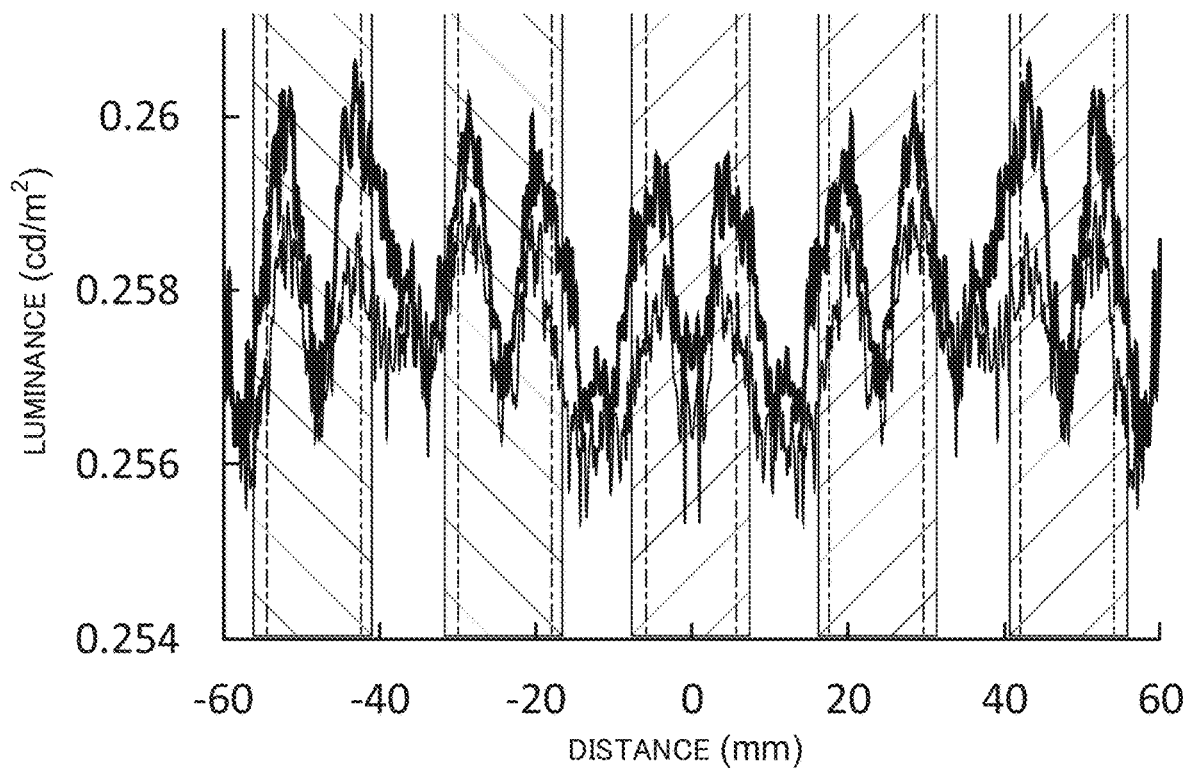
Figure 14A:
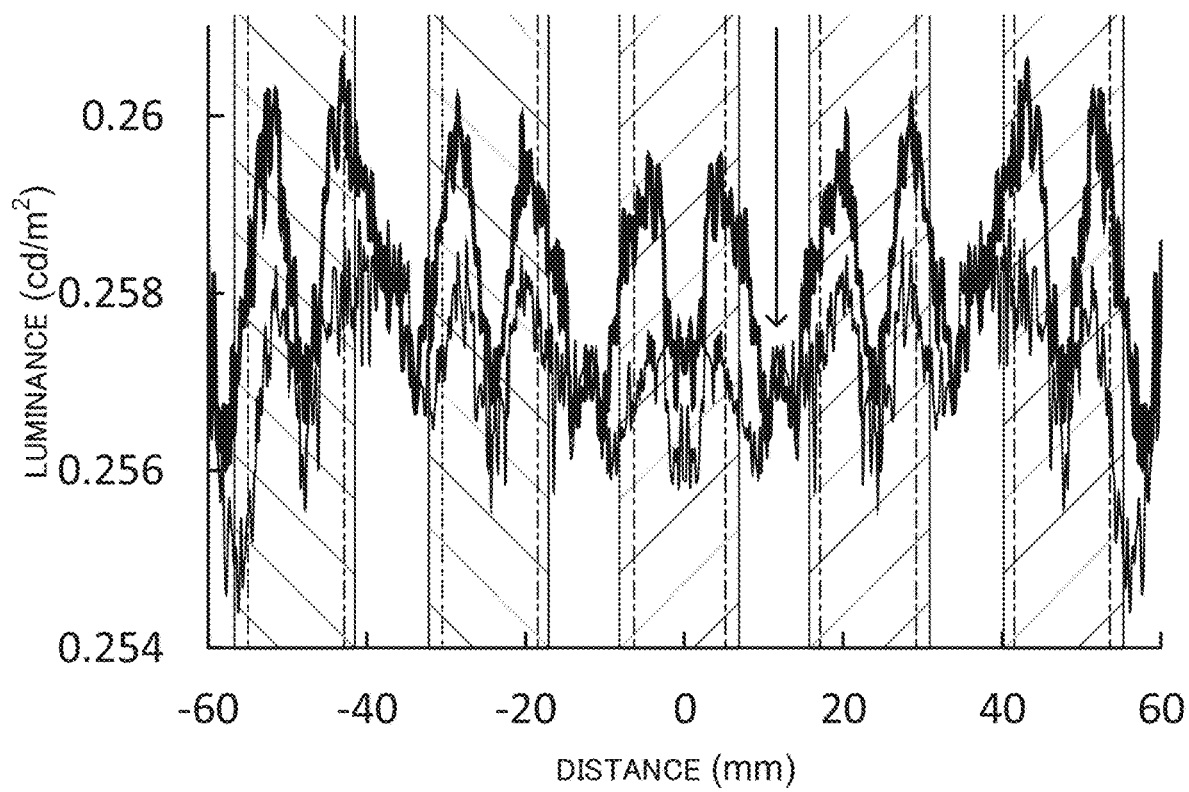
FIGS. 14A and 14B illustrate a chromaticity distribution on line A of FIG. 6.
Figure 14B:
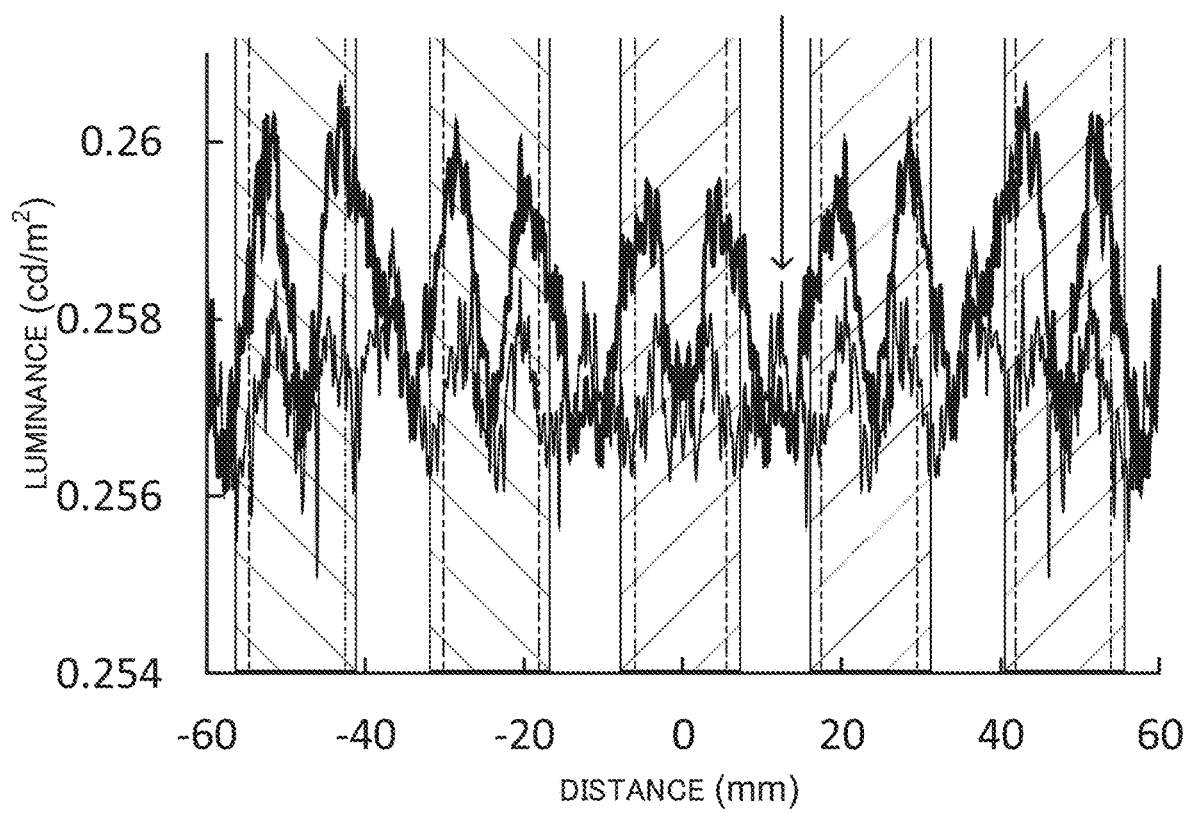
Figure 15:
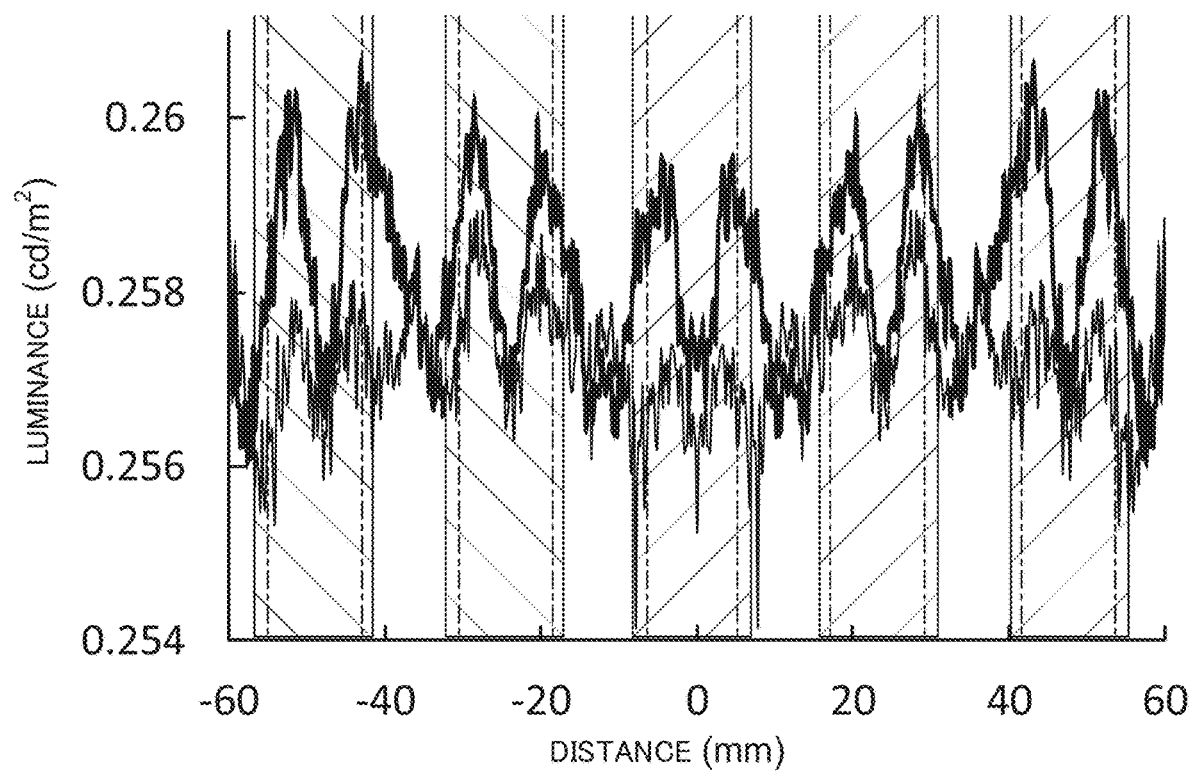
FIG. 15 illustrates another chromaticity distribution on line A of FIG. 6.

FIGS. 13A to 15 illustrate chromaticity distributions at line A of FIG. 6. FIG. 13A is a chromaticity distribution of a case where a light flux controlling member produced using a resin composition containing the silicone particle with a number-average particle diameter of 7.0 µm is used as a scattering member, and FIG. 13B is a chromaticity distribution of a case where a light flux controlling member produced using a resin composition containing the silicone particle with a number-average particle diameter of 4.5 µm is used as a scattering member. FIG. 14A is a chromaticity distribution of a case where a light flux controlling member produced using a resin composition containing the silicone particle with a number-average particle diameter of 0.7 µm is used as a scattering member, and FIG. 14B is a chromaticity distribution of a case where a light flux controlling member produced using a resin composition containing the silicone particle with a number-average particle diameter of 0.3 µm is used as a scattering member. FIG. 15 is a chromaticity distribution of a case where a light flux controlling member produced using a resin composition containing the melamine-formaldehyde condensation particle with a number-average particle diameter of 0.4 µm is used as a scattering member.

Figure 16A:
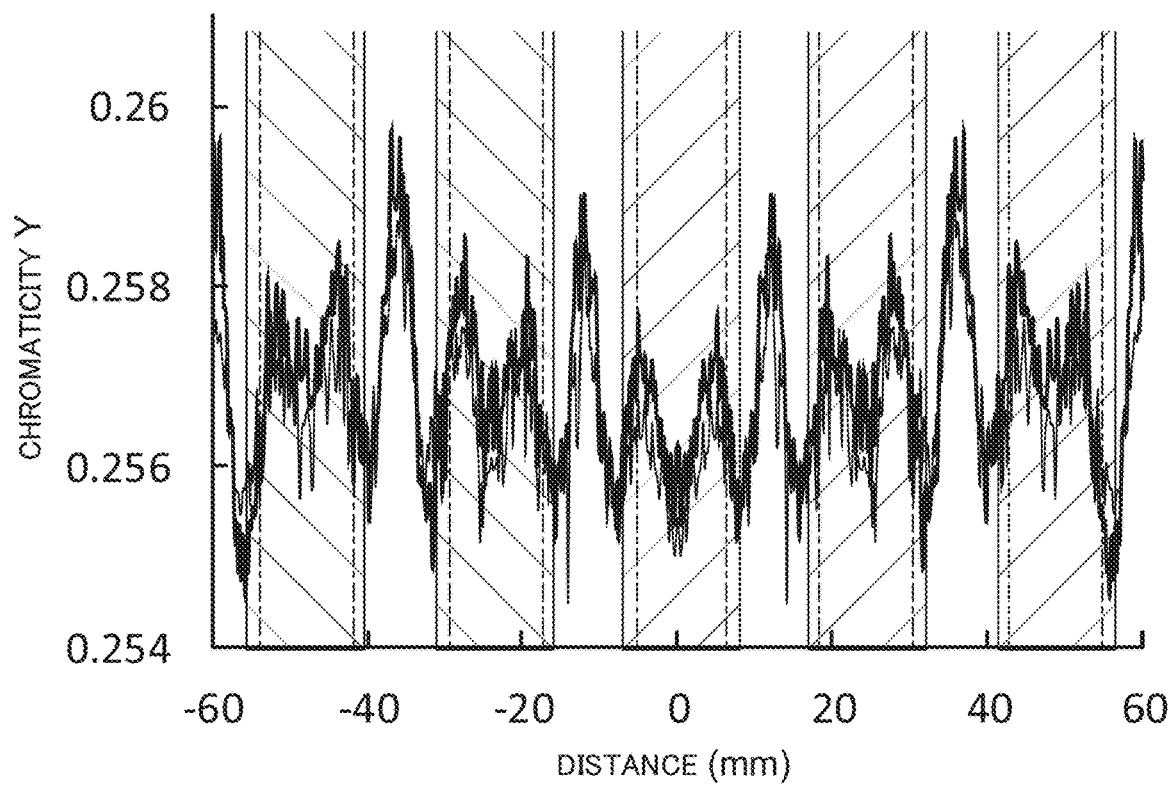
FIGS. 16A and 16B illustrate a chromaticity distribution on line B of FIG. 6.
Figure 16B:
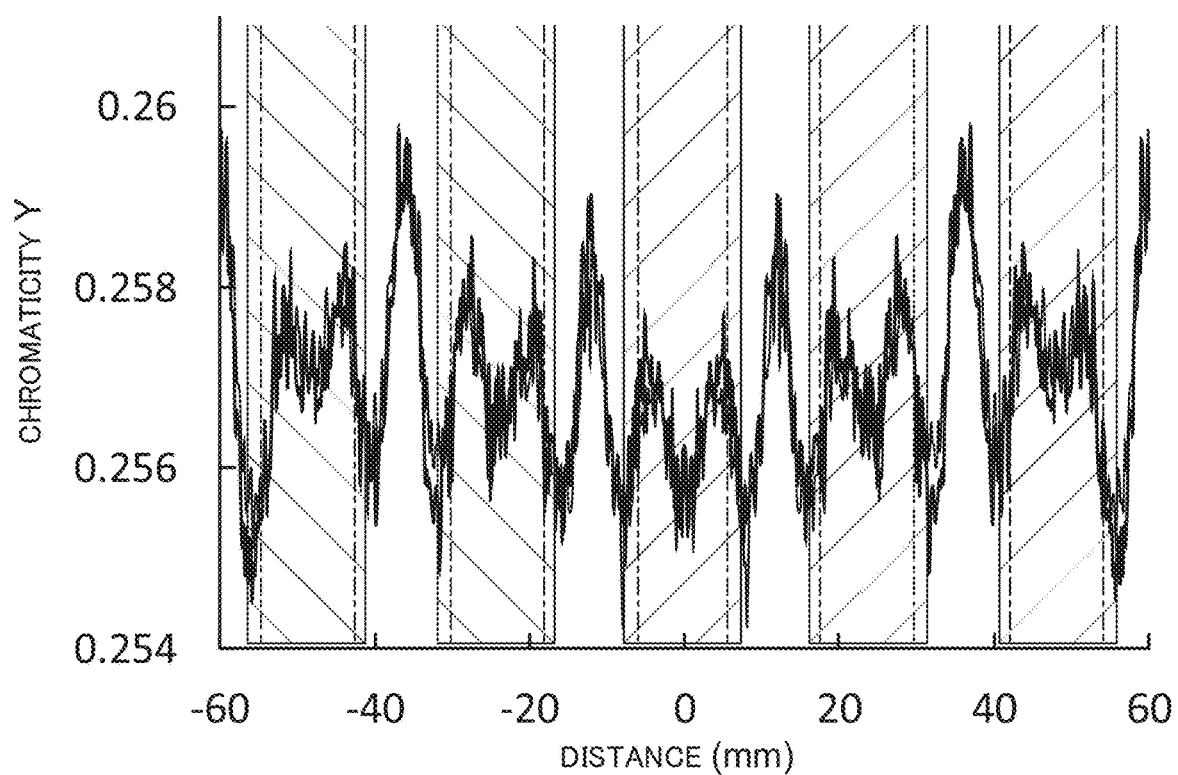
Figure 17A:
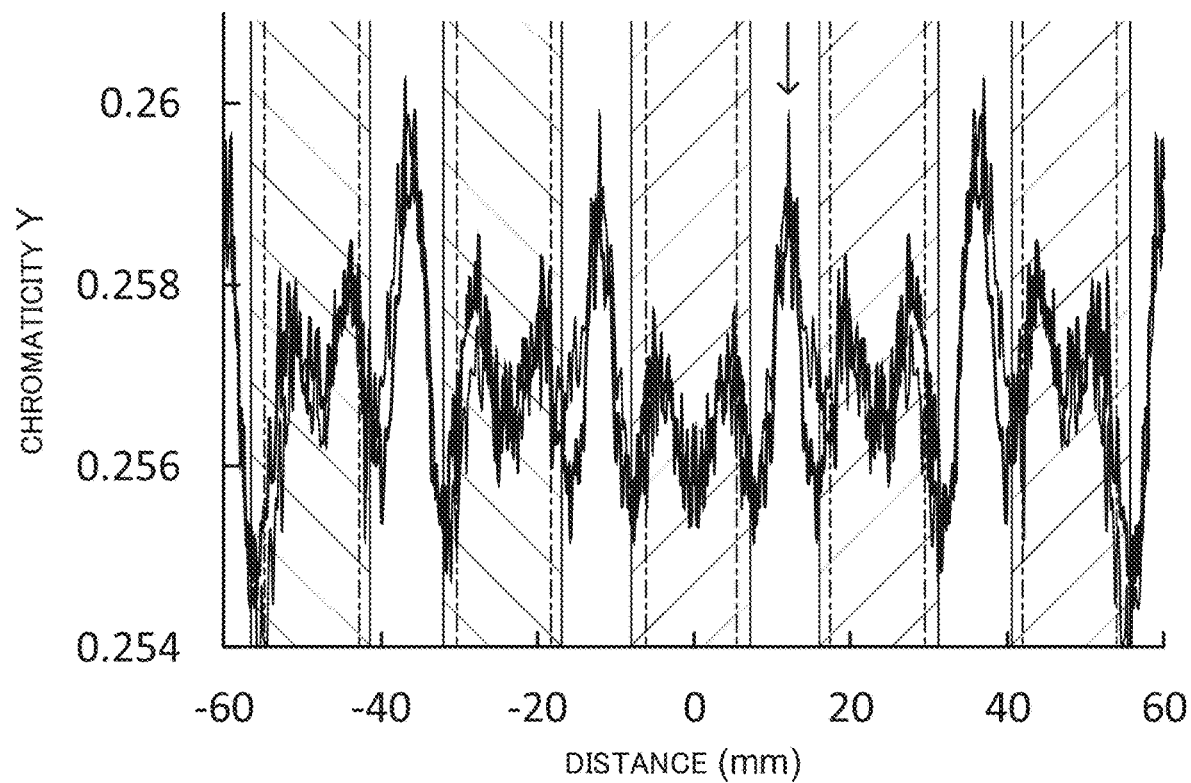
FIGS. 17A and 17B illustrate a chromaticity distribution on line B of FIG. 6.
Figure 17B:
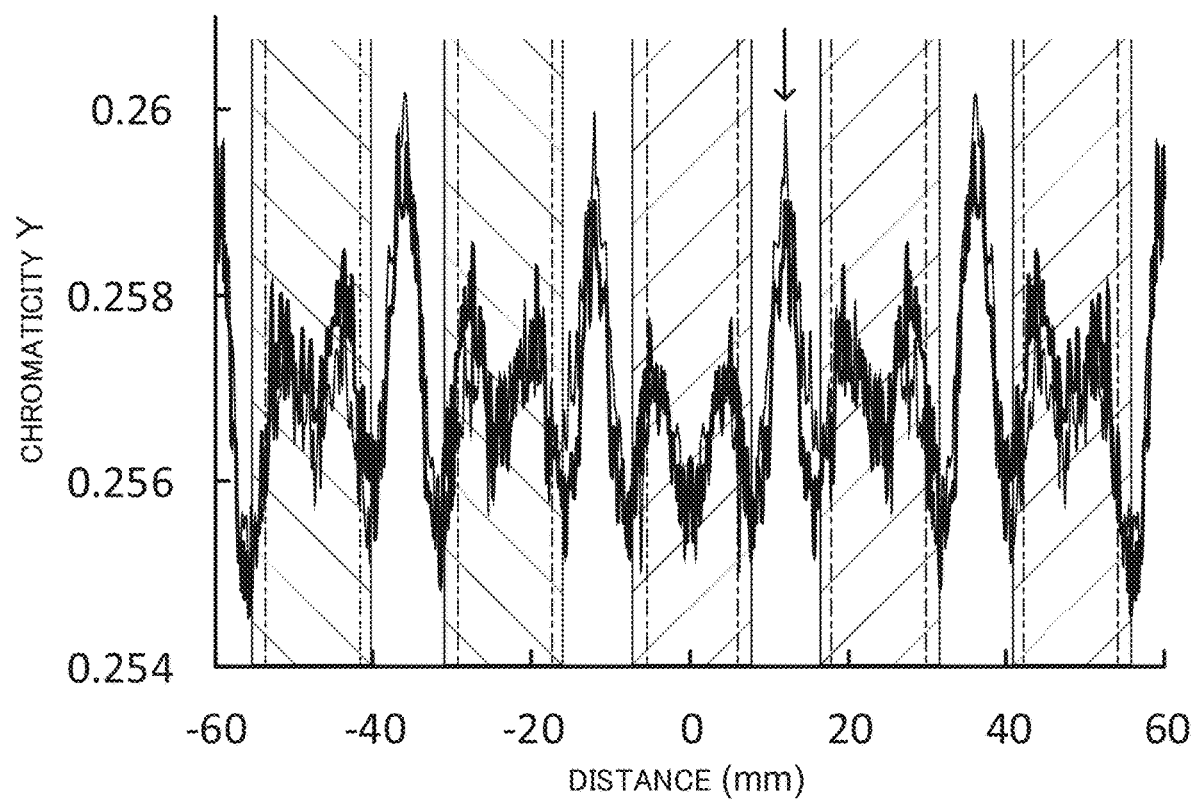
Figure 18:
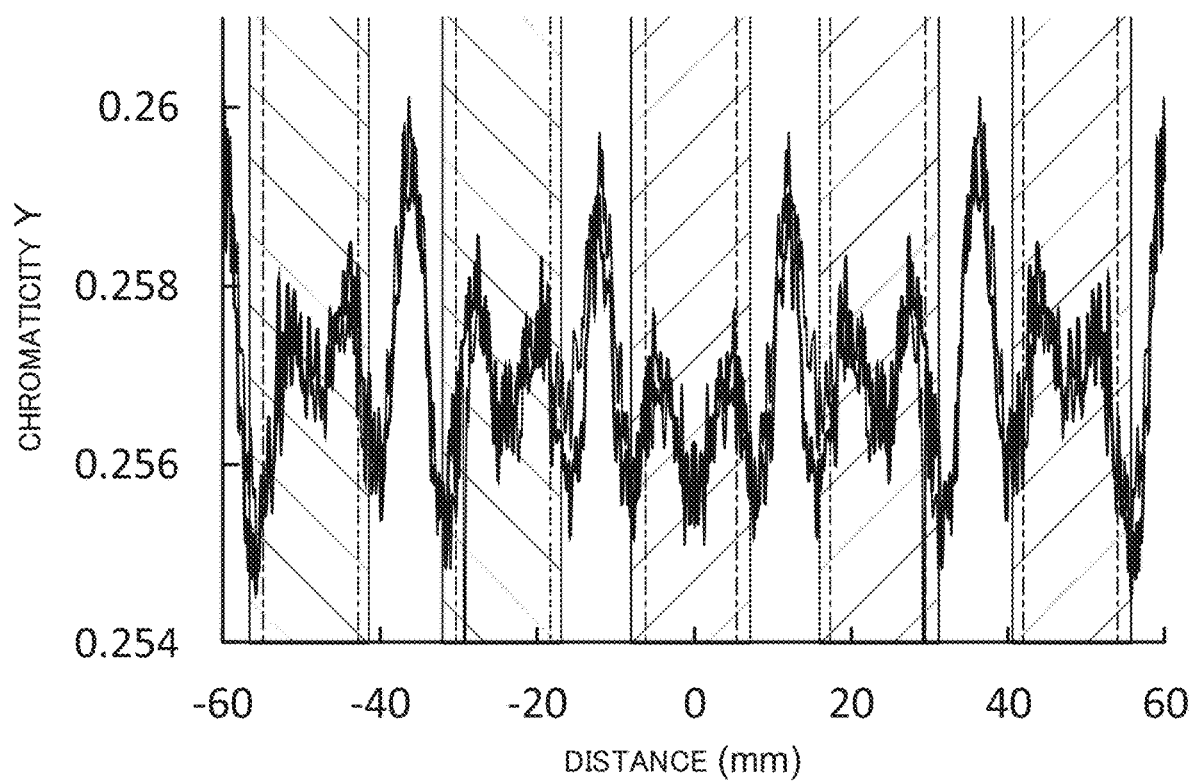
FIG. 18 illustrates another chromaticity distribution on line B of FIG. 6.

FIGS. 16A to 18 illustrate chromaticity distributions at line B of FIG. 6. FIG. 16A is a chromaticity distribution of a case where a light flux controlling member produced using a resin composition containing the silicone particle with a number-average particle diameter of 7.0 µm is used as a scattering member, and FIG. 16B is a chromaticity distribution of a case where a light flux controlling member produced using a resin composition containing the silicone particle with a number-average particle diameter of 4.5 µm is used as a scattering member. FIG. 17A is a chromaticity distribution of a case where a light flux controlling member produced using a resin composition containing the silicone particle with a number-average particle diameter of 0.7 µm is used as a scattering member, and FIG. 17B is a chromaticity distribution of a case where a light flux controlling member produced using a resin composition containing the silicone particle with a number-average particle diameter of 0.3 µm is used as a scattering member. FIG. 18 is a chromaticity distribution of a case where a light flux controlling member produced using a resin composition containing the melamine-formaldehyde condensation particle with a number-average particle diameter of 0.4 µm is used as a scattering member.

In FIGS. 13A to 18, the abscissa indicates the distance from the position of X=0 illustrated in FIG. 6, and the ordinate indicates chromaticity Y value. In FIGS. 13A to 18, the thick solid line indicates a result of a case where a light flux controlling member with no scattering member 300 is used, and the thin solid line indicates a result of a case where light flux controlling members provided with respective scattering members are used. In FIGS. 13A to 18, the hatched region corresponds to light flux controlling member 300, and the dashed line indicates light axis LA of light-emitting element 220.

As illustrated in FIGS. 13A to 18, it was confirmed that the chromaticity unevenness decreases when a predetermined light flux controlling member 300 according to the present embodiment is used in comparison with a light flux controlling member with no scattering member. In particular, by comparison between FIGS. 13A, 13B and 15, and FIGS. 14A and 14B, and comparison between FIGS. 16A, 16B and 18, and FIGS. 17A and 17B, in the case where the light flux controlling member that less scatters the red light with a wavelength of 625 to 780 nm was used, there was a significant tendency of the shift to yellow light (see the arrows in FIGS. 14A, 14B, 17A and 17B).

Luminance Distribution and Chromaticity Distribution

Figure 19A:
FIGS. 19A, 19B, 19C, 19D, 19E and 19F are diagrams for explaining an effect of a scattering member.
Figure 19D:
Figure 19B:
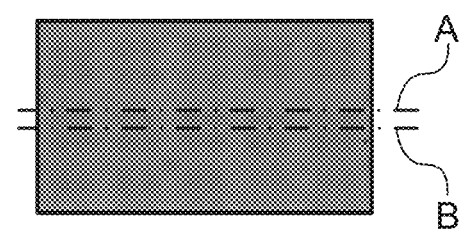
Figure 19E:
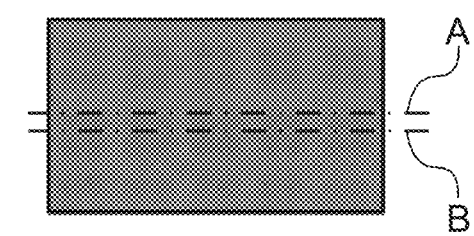
Figure 19C:
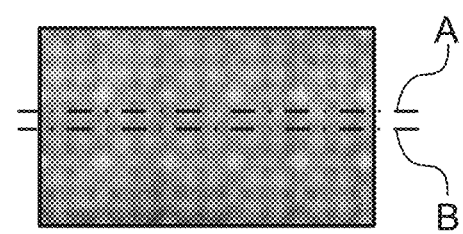
Figure 19F:
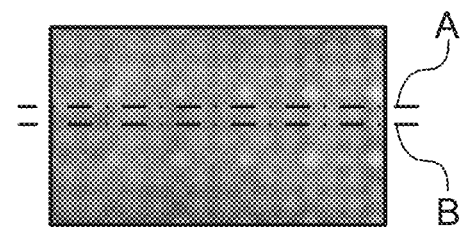

FIGS. 19A to 19F are diagrams for explaining an effect of a scattering member. As the scattering member, the silicone particle with a number-average particle diameter of 7 µm was used. FIGS. 19A to 19C illustrate a result of a case where a light flux controlling member using no scattering member was used, and FIGS. 19D and 19F illustrate a result of a case where a scattering member was used. FIGS. 19A and 19D illustrate luminance distributions of a case where light diffusion plate 410 was used as optical sheet 400, and FIGS. 19B and 19E illustrate luminance distributions of a case where light diffusion plate 410, quantum dot sheet 420, first prism sheet 430, second prism sheet 440, dual brightness enhancement film 450 were used as optical sheet 400. FIGS. 19C and 19F illustrate the chromaticity distribution. Line A of FIGS. 19A to 19F is a line passing through light axis LA of light-emitting element 220, and line B of FIGS. 19A to 19F is a line passing through a center of light flux controlling member 300.

Through the comparison of FIGS. 19A and 19D, it was confirmed that the luminance unevenness is suppressed when light flux controlling member 300 including a predetermined scattering member is used. In particular, it was confirmed that the luminance unevenness over light-emitting element 220 is suppressed.

Through the comparison of FIGS. 19C and 19F, it was confirmed that the chromaticity unevenness is also suppressed when light flux controlling member 300 including a predetermined scattering member is used. In particular, it was confirmed that the chromaticity unevenness of light-emitting device 200 is suppressed.

Figure 20A:
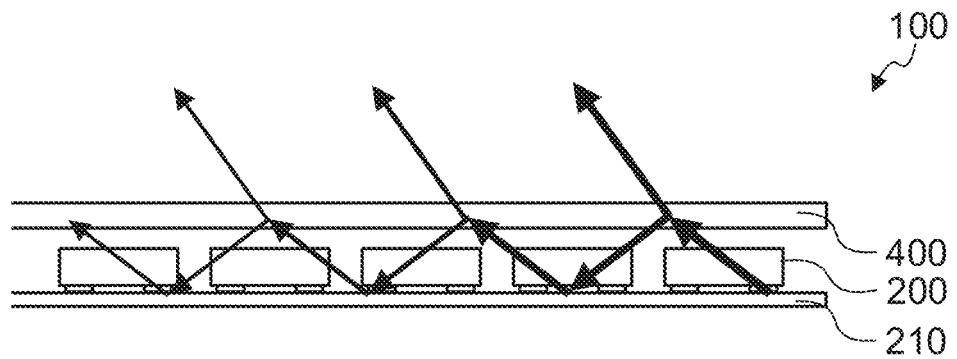
FIGS. 20A and 20B are diagrams for explaining a reason for improvement in chromaticity unevenness.
Figure 20B:
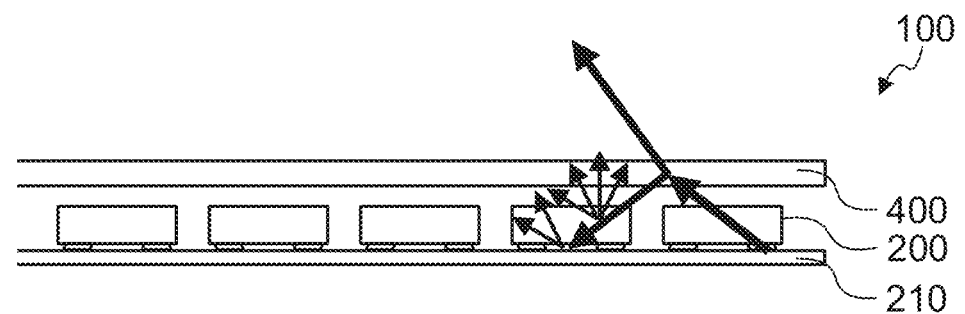

Here, a reason for improvement in chromaticity unevenness as well as luminance unevenness surface in light source device 100 according to the present embodiment was speculated. FIGS. 20A and 20B are schematic views for describing a reason for improvement in chromaticity unevenness. FIG. 20A illustrates advancement of light in a known surface light source device, and FIG. 20B illustrates advancement of light in surface light source device 100 according to the present embodiment.

As illustrated in FIG. 20A, in a known surface light source device, a part of the light emitted from light-emitting device 200 is subjected to wavelength conversion at optical sheet 400 and is emitted to the outside. In addition, another part of the light is subjected to the wavelength conversion at optical sheet 400 and is reflected toward substrate 210. The light reflected toward substrate 210 is reflected toward optical sheet 400 again. Further, a part of the light reflected toward optical sheet 400 is further subjected to wavelength conversion at light optical sheet 400, and is reflected toward substrate 210 again. In this manner, in a known surface light source device, the internal reflection and the wavelength conversion at optical sheet 400 are repeated, and the wavelength of a part of light is significantly changed, thus causing chromaticity unevenness.

As illustrated in FIG. 20B, in surface light source device 100 according to the present embodiment, a part of the light emitted from light-emitting device 200 is subjected to the wavelength conversion at optical sheet 400, and is emitted to the outside. In addition, another part of the light is subjected to the wavelength conversion at optical sheet 400, and is reflected toward substrate 210. The light reflected toward substrate 210 has been subjected to wavelength conversion, and therefore scatters at light flux controlling member 300. Thus, the situation where light whose wavelength has been once converted at optical sheet 400 repeats the internal reflection and the wavelength conversion at optical sheet 400 is suppressed. It is considered that this results in the suppression of the chromaticity unevenness caused at the known surface light source device. Note that the light emitted from light-emitting element 220 is blue light, and is therefore emitted from light flux controlling member 300 after the light distribution is appropriately controlled without being strongly scattered inside light flux controlling member 300.

It is considered that in surface light source device 100 according to the present embodiment, the light that is reflected while being subjected to the wavelength conversion at optical sheet 400 scatters inside light flux controlling member 300, and thus not only the luminance unevenness but also the chromaticity unevenness can be eliminated.

Effect

As described above, in surface light source device 100 according to the present embodiment, light flux controlling member 300 appropriately controls the distribution of the light immediately after emission from light-emitting element 220, while the light that is reflected while being subjected to the wavelength conversion at optical sheet 400 is scattered, and thus, the light successively reflected inside surface light source device 100 can be reduced. In this manner, surface light source device 100 can suppress the luminance unevenness and the chromaticity unevenness.

Embodiment 2

Next, surface light source device 500 according to Embodiment 2 is described. Surface light source device 500 according to the present embodiment is different from surface light source device 100 according to Embodiment 1 only in the configuration of light flux controlling member 800 and the correspondence relationship of light-emitting element 220 and light flux controlling member 800. In view of this, in the present embodiment, the configuration of light flux controlling member 800 and the correspondence relationship of light-emitting element 220 and light flux controlling member 800 are mainly described, the components similar to those of surface light source device 100 of Embodiment 1 are denoted with the same reference numerals, and the description thereof will be omitted.

Figure 21A:
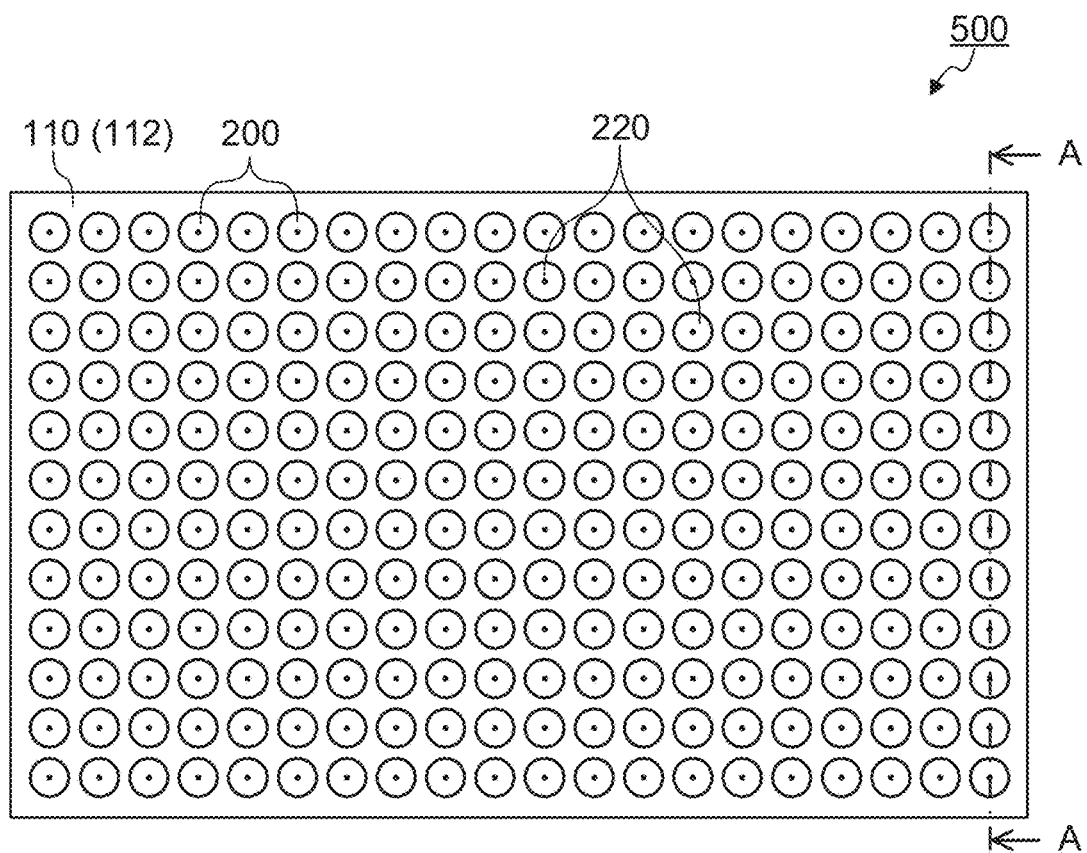
FIGS. 21A and 21B are diagrams illustrating a configuration of a surface light source device according to Embodiment 2.
Figure 21B:
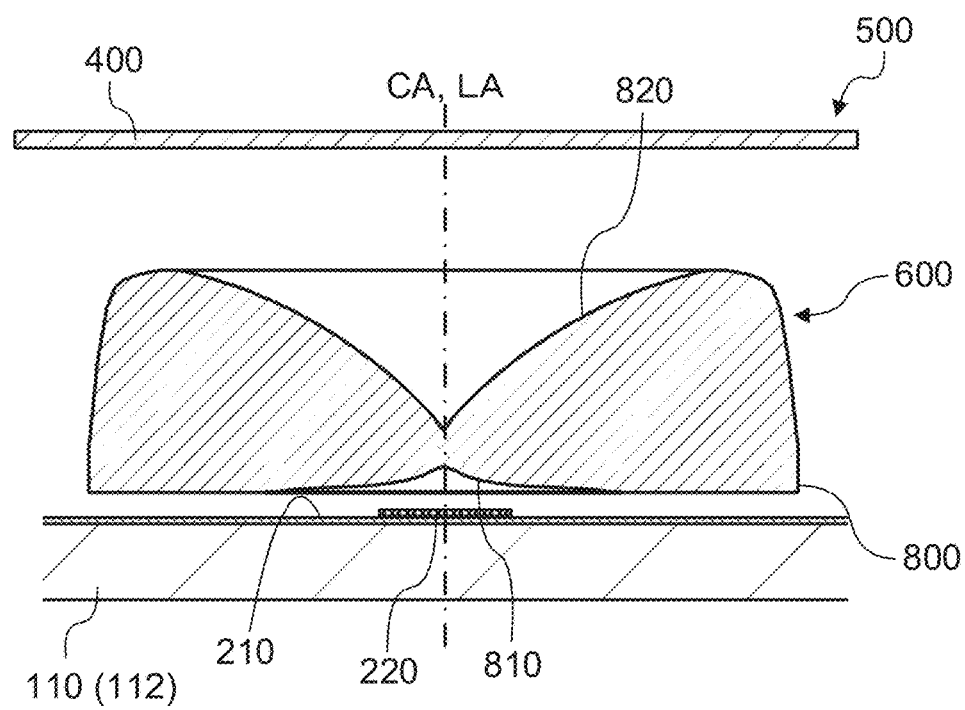

FIG. 21A is a sectional view of surface light source device 500 from which top plate 114 and optical sheet 400 are removed, and FIG. 21B is a partially enlarged view taken along line A-A of FIG. 21A.

As illustrated in FIGS. 21A and 21B, surface light source device 500 includes a plurality of light-emitting devices 600 including light-emitting element 220 and light flux controlling member 800, and optical sheet 400, and is disposed inside housing 110. In the present embodiment, one light flux controlling member 800 is disposed for one light-emitting element 220.

Configuration of Light Flux Controlling Member

FIGS. 22A to 22D are diagrams illustrating a configuration of light flux controlling member 800 according to Embodiment 2. FIG. 22A is a plan view of light flux controlling member 800, FIG. 22B is a bottom view, FIG. 22C is a front view, and FIG. 22D is a sectional view taken along line A-A of FIG. 22A.

As illustrated in FIGS. 22A to 22D, light flux controlling member 800 according to the present embodiment includes first optical surface 810, second optical surface 820, third optical surface 830, and fourth optical surface 840.

First optical surface 810 is disposed on the rear side to face light-emitting element 220. First optical surface 810 allows the light emitted from light-emitting element 220 to enter light flux controlling member 800, or transmits another incident light, or, reflects another incident light. The shape of first optical surface 810 is not limited as long as the above-described function can be ensured. In the present embodiment, the shape of first optical surface 810 is an inner surface of a recess formed on the rear side of light flux controlling member 800. First optical surface 810 has a shape that intersects light axis LA of light-emitting element 220 and is rotationally symmetrical (circularly symmetrical) about first axis A1 first optical surface 810. More specifically, in the present embodiment, first optical surface 810 has a shape that is formed such that the distance from substrate 140 gradually decreases as the distance from light axis LA of light-emitting element 220 increases. More specifically, first optical surface 810 has a shape in which the angle of the tangent to the optical axis gradually increases as the distance from light axis LA increases. First optical surface 810 may include a region where the incidence angle at first optical surface 810 of the light emitted from the center of the light-emitting surface of light-emitting element 220 is 60 degrees or greater. When the angle is 60 degrees or greater, a part of the light emitted from light-emitting element 220 is reflected at light first optical surface 810, but even in such a case, light flux controlling member 800 according to the present embodiment can appropriately control the light distribution.

Second optical surface 820 is disposed at a position (front side) opposite light-emitting element 220 with first optical surface 810 therebetween. Second optical surface 820 internally reflects light entered from first optical surface 810 in the direction along the surface of substrate 140, or transmits another part of incident light. Second optical surface 820 is not limited as long as the above-mentioned function can be ensured. In the present embodiment, second optical surface 820 has a shape that intersects light axis LA of light-emitting element 220, and is rotationally symmetrical (circularly symmetrical) about second axis A2 of second optical surface 820. More specifically, second optical surface 820 has a shape in which the distance from substrate 140 increases as the distance from light axis LA of light-emitting element 220 increases. With such a shape, second optical surface 820 suppresses the direct upward transmission of the light entered from first optical surface 810 after emission from light-emitting element 220, and prevents generation of a bright spot at a portion immediately above light-emitting element 220, and, prevents generation of a dark point at a portion between light-emitting elements 220 by guiding the light to a portion between light-emitting elements 220.

In the rotationally symmetrical shape, the generatrix from the center portion to the outer periphery portion is a curve or a straight line inclined with respect to second axis A2 of second optical surface 820. Second optical surface 820 is a recessed surface obtained by rotating the generatrix 360 degrees around second axis A2 as a rotation axis.

As described above, in the present embodiment, light-emitting element 220 with a light-emitting surface smaller than the light-emitting surface of known light-emitting element 220 is used. In the present embodiment, the size of the light-emitting surface of light-emitting element 220 is extremely small with respect to second optical surface 820. More specifically, in plan view, the ratio of the area of second optical surface 820 and the area of the light-emitting surface of light-emitting element 220 is preferably 80:1 to 5:1. If the ratio falls outside the above-mentioned range, the quantity of the light that travels to a portion immediately above light flux controlling member 800 may be large, and a bright spot may be formed in the portion immediately above light flux controlling member 800.

Third optical surface 830 is connected to second optical surface 820 and fourth optical surface 840. Third optical surface 830 internally reflects the light reflected by second optical surface 820 toward substrate 140 (fourth optical surface 840), or transmits another incident light. In the present embodiment, third optical surface 830 is a side surface of light flux controlling member 800, and is disposed outside second optical surface 820. Third optical surface 830 is not limited as long as the above-mentioned function can be ensured. In the present embodiment, third optical surface 830 has a shape that is rotationally symmetrical (circularly symmetrical) about third axis A3 of third optical surface 830. More specifically, in the present embodiment, the shape of third optical surface 830 is approximately parallel to third axis A3.

Fourth optical surface 840 is a rear surface of light flux controlling member 800, and extends in a direction away from fourth axis A4 of fourth optical surface 840 to surround first optical surface 810. Fourth optical surface 840 reflects, toward second optical surface 820, a part of the light reflected by third optical surface 830. In the present embodiment, fourth optical surface 840 is connected to the outer edge of first optical surface 810, and disposed approximately parallel to the light-emitting surface of light-emitting element 220. In the present embodiment, third optical surface 830 is connected to the outer edge of fourth optical surface 840.

Note that, also in surface light source device 500 according to the present embodiment, light flux controlling member 800 includes a predetermined scattering member, and it is thus possible to suppress the luminance unevenness and the chromaticity unevenness as with surface light source device 100 of Embodiment 1.

Effect

According to the present invention, surface light source device 500 according to the present embodiment has an effect similar to that of surface light source device 100 according to Embodiment 1.

INDUSTRIAL APPLICABILITY

The surface light source device of the present invention is applicable to backlights of liquid crystal display devices, generally-used illumination apparatuses and the like, for example.

REFERENCE SIGNS LIST 100, 500 Surface light source device
100' Display device
102 Display member
110 Housing
112 Bottom plate
114 Top plate
200, 600 Light-emitting device
210 Substrate
220 Light-emitting element
300, 800 Light flux controlling member
310 Incidence unit
320 Incidence surface
321 First reflection surface
330 Emission unit
332 Second emission surface
333 First emission surface
390 Ridge
391 First inclined surface
392 Second inclined surface
393 Ridgeline
400 Optical sheet
410 Light diffusion plate
420 Quantum dot sheet
430 First prism sheet
440 Second prism sheet
450 Dual brightness enhancement film
810 First optical surface
820 Second optical surface
830 Third optical surface
840 Fourth optical surface
CA Central axis
LA Optical axis
LED Blue

The invention claimed is:

1. A surface light source device comprising:
a plurality of light-emitting devices, each of the plurality of light-emitting devices including a plurality of light-emitting elements disposed on a substrate and configured to emit light with a wavelength of 380 to 485 nm and a light flux controlling member disposed over the plurality of light-emitting elements and configured to control a distribution of light emitted from the plurality of light-emitting elements; and
an optical sheet including a wavelength conversion sheet disposed over the light flux controlling member and configured to convert a wavelength of incident light,
wherein there is a gap between the plurality of light-emitting devices adjacent to each other,
wherein the light flux controlling member includes:
a plurality of incidence units configured to allow incidence of light emitted from the plurality of light-emitting elements; and
a plurality of emission units disposed between the plurality of incidence units and configured to emit light entered from the plurality of incidence units while guiding the light entered from the plurality of incidence units,
wherein the light flux controlling member is formed with a resin composition or a glass composition containing a scattering member, and makes scattering of light with a wavelength longer than the wavelength of 380 to 485 nm large.

2. The surface light source device according to claim 1, wherein the light with the wavelength longer than the wavelength of 380 to 485 nm is light with a wavelength of 625 to 780 nm.

3. The surface light source device according to claim 1, wherein the wavelength conversion sheet includes:
a first quantum dot configured to convert at least a part of the light with the wavelength of 380 to 485 nm into light with a wavelength of 625 to 780 nm; and
a second quantum dot configured to convert at least a part of the light with the wavelength of 380 to 485 nm into light with a wavelength of 500 to 585 nm.

4. The surface light source device according to claim 2, wherein the wavelength conversion sheet includes:
a first quantum dot configured to convert at least a part of the light with the wavelength of 380 to 485 nm into light with a wavelength of 625 to 780 nm; and
a second quantum dot configured to convert at least a part of the light with the wavelength of 380 to 485 nm into light with a wavelength of 500 to 585 nm.

5. The surface light source device according to claim 1, wherein a number-average particle diameter of the scattering member is 4 μm or greater.

6. The surface light source device according to claim 1, wherein the scattering member is a silicone particle.

7. The surface light source device according to claim 1, wherein a distance between the substrate and the optical sheet is 5 mm or smaller.

8. A display device comprising:
the surface light source device according to claim 1; and
a display member configured to be irradiated with light emitted from the surface light source device.

9. The light flux controlling member configured to be used in the surface light source device according to claim 1.

10. The light flux controlling member configured to be used in the surface light source device according to claim 2.

11. The light flux controlling member configured to be used in the surface light source device according to claim 3.

12. The light flux controlling member configured to be used in the surface light source device according to claim 4.

13. The light flux controlling member configured to be used in the surface light source device according to claim 5.

14. The light flux controlling member configured to be used in the surface light source device according to claim 6.

15. The light flux controlling member configured to be used in the surface light source device according to claim 7.

16. The surface light source device according to claim 1, wherein each of the plurality of incidence units includes:
an incidence surface that allows incidence of light emitted from the plurality of light-emitting elements; and
a first reflection surface that reflects, toward the plurality of emission units, light entered from the incidence surface.

* * * * *